(12) United States Patent
Kim et al.

(10) Patent No.: US 9,743,033 B2
(45) Date of Patent: Aug. 22, 2017

(54) METHOD FOR DISPLAYING IMAGE COMBINED WITH PLAYING AUDIO IN AN ELECTRONIC DEVICE

(71) Applicant: Samsung Electronics Co., Ltd., Gyeonggi-do (KR)

(72) Inventors: Hyun-Jung Kim, Seoul (KR); Cheol-Ho Cheong, Seoul (KR); Jin-Woo Kim, Seoul (KR); Ki-Huk Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 169 days.

(21) Appl. No.: 14/162,175

(22) Filed: Jan. 23, 2014

(65) Prior Publication Data

US 2014/0314391 A1  Oct. 23, 2014

(30) Foreign Application Priority Data

Mar. 18, 2013  (KR) .................. 10-2013-0028858

(51) Int. Cl.
| | |
|---|---|
| *H04N 5/93* | (2006.01) |
| *G11B 27/11* | (2006.01) |
| *G11B 27/28* | (2006.01) |
| *G11B 27/34* | (2006.01) |
| *G06F 3/0484* | (2013.01) |

(52) U.S. Cl.
CPC ........... *H04N 5/93* (2013.01); *G06F 3/04842* (2013.01); *G11B 27/11* (2013.01); *G11B 27/28* (2013.01); *G11B 27/34* (2013.01)

(58) Field of Classification Search
None
See application file for complete search history.

(56) References Cited

U.S. PATENT DOCUMENTS

| | | | |
|---|---|---|---|
| 6,774,939 | B1 | 8/2004 | Peng |
| 2003/0174893 | A1 | 9/2003 | Sun et al. |
| 2004/0227856 | A1 | 11/2004 | Cooper |
| 2004/0263636 | A1 | 12/2004 | Cutler et al. |
| 2005/0191036 | A1 | 9/2005 | Okutani et al. |
| 2008/0043144 | A1 | 2/2008 | Amir et al. |

(Continued)

FOREIGN PATENT DOCUMENTS

| | | |
|---|---|---|
| CN | 101300839 | 11/2008 |
| CN | 101350906 | 1/2009 |

(Continued)

OTHER PUBLICATIONS

Fu et al., "Estimating Human Age by Manifold Analysis of Face Pictures and Regression on Aging Features", 2007 IEEE International Conference on Multimedia and Expo, Jul. 1, 2007.

(Continued)

*Primary Examiner* — Eileen Adams
(74) *Attorney, Agent, or Firm* — The Farrell Law Firm, P.C.

(57) ABSTRACT

A method for generating an image combined with audio, and image display and audio output includes displaying an image, when a first image object within the image is selected, outputting a first audio object corresponding to the first image object and, when a second image object within the image is selected, outputting a second audio object corresponding to the second image object.

32 Claims, 20 Drawing Sheets

(56) References Cited

U.S. PATENT DOCUMENTS

| | | | | |
|---|---|---|---|---|
| 2009/0028347 | A1* | 1/2009 | Duraiswami | H04R 1/406 381/26 |
| 2009/0154896 | A1* | 6/2009 | Matono | H04N 5/772 386/241 |
| 2010/0182324 | A1 | 7/2010 | Ko et al. | |
| 2010/0194849 | A1 | 8/2010 | Bruno | |
| 2010/0299144 | A1 | 11/2010 | Barzelay et al. | |
| 2010/0325581 | A1* | 12/2010 | Finkelstein | G06F 17/30 715/810 |
| 2011/0039598 | A1 | 2/2011 | Tang et al. | |
| 2011/0216194 | A1* | 9/2011 | Kosaki | H04N 7/18 348/148 |
| 2012/0027217 | A1 | 2/2012 | Jun et al. | |
| 2012/0062700 | A1 | 3/2012 | Antonellis et al. | |
| 2012/0098946 | A1 | 4/2012 | Seung | |
| 2012/0113281 | A1 | 5/2012 | Kim | |
| 2012/0293692 | A1 | 11/2012 | Namie et al. | |
| 2013/0000463 | A1* | 1/2013 | Grover | G06Q 30/04 84/483.2 |
| 2013/0265450 | A1* | 10/2013 | Barnes, Jr. | H04N 5/77 348/207.1 |
| 2013/0271559 | A1 | 10/2013 | Feng et al. | |

FOREIGN PATENT DOCUMENTS

| | | |
|---|---|---|
| CN | 101639922 | 2/2010 |
| CN | 101997969 | 3/2011 |
| CN | 102256098 | 11/2011 |
| CN | 102790851 | 11/2012 |
| CN | 102868875 | 1/2013 |
| JP | 11-177928 | 7/1999 |
| WO | WO 2011/019467 | 2/2011 |
| WO | WO 2012/177229 | 12/2012 |

OTHER PUBLICATIONS

Guo et al., "Locally Adjusted Robust Regression for Human Age Estimation", IEEE Workshop on Applications of Computer Vision, Jan. 7, 2008.

Lanitis et al., "Comparing Different Classifiers for Automatic Age Estimation", IEEE Transactions on Systems, Man, and Cybernetics, Part B: Cybernetics, Feb. 1, 2004.

Kwon et al., "Age Classification from Facial Images", Computer Vision and Image Understanding, Apr. 1, 1999.

Ramanathan et al., "Face Verification Across Age Progression", IEEE Transactions on Image Processing, vol. 15, No. 11, Jan. 1, 2006.

Zhou et al., "Image Based Regression Using Boosting Method", 10th IEEE International Conference on Computer Vision, Oct. 17, 2005.

Sakarkaya et al., "Comparison of Several Classification Algorithms for Gender Recognition from Face Images", 2012 IEEE 16th International Conference on Intelligent Engineering Systems, Jun. 13, 2012.

European Search Report dated Dec. 1, 2014 issued in counterpart application No. 13195038.8-1907.

Australian Examination Report dated Dec. 16, 2014 issued in counterpart application No. 2013263740.

Australian Examination Report dated Dec. 11, 2015 issued in counterpart application No. 2013263740, 5 pages.

Chinese Office Action dated Nov. 9, 2016 issued in counterpart application No. 201410101299.X, 38 pages.

Chinese Office Action dated May 3, 2017 issued in counterpart application No. 201410101299.X, 26 pages.

* cited by examiner

METHOD FOR DISPLAYING IMAGE COMBINED WITH PLAYING AUDIO IN AN ELECTRONIC DEVICE

PRIORITY

This application claims priority under 35 U.S.C. §119(a) to a Korean Patent Application filed in the Korean Intellectual Property Office on Mar. 18, 2013 and assigned Serial No. 10-2013-0028858, the contents of which are incorporated herein by reference.

BACKGROUND OF THE INVENTION

1. Field of the Invention

The present invention relates generally to playing an image and audio in an electronic device.

2. Description of the Related Art

Many electronic devices can operate as multimedia devices providing at least one or more functions of inputting, editing, inquiring or playing an image and audio. These electronic devices support various file formats and codecs. Generally, a format of a multimedia file, which is a container of a predetermined format containing media data encoded according to a codec, includes such information as play location information within a media and time information of the media. The multimedia file can provide various functions such as play, pause, and search.

For example, the image can be a still image or a video, and often uses codecs or file formats such as Joint Photographic Experts Group (JPEG), Graphics Interchange Format (GIF), Bitmap (BMP), Tagged Image File Format (TIFF), AI, H.263, H.264, Moving Picture Experts Group (MPEG), Audio Video Interleave (AVI), Windows Media Video (WMV), DivX, XviD, MOV, Active Streaming Format (ASF), and VP8. The audio often uses codecs or file formats such as G.711, G.726, G.723, G.729, Enhanced Variable Rate CODEC (EVRC), Adaptive Multi-Rate (AMR), Arc Consistency-3 (AC-3), Windows Media Audio (WMA), MPEG Audio layer-3 (MP3), Musical Instrument Digital Interface (MIDI), Pulse-Code Modulation (PCM), Adaptive Differential Pulse-Code Modulation (ADPCM), 3rd Generation Partnership Project (3GPP), 3rd Generation Partnership Project 2 (3GPP2), and Ogg Vorbis.

As described above, various electronic devices can provide visual data to a user by using a camera function.

SUMMARY OF THE INVENTION

An aspect of the present invention is to address at least the above problems and/or disadvantages and to provide at least the advantages below. Accordingly, one aspect of the present invention can combine an image and audio in an electronic device.

Another aspect of the present invention is to extract audio corresponding to each subject within an image, from audio recorded at image-taking in an electronic device.

A further aspect of the present invention is to correspond audio recorded at image-taking, to each subject within an image in an electronic device.

Yet another aspect of the present invention is to selectively output audio corresponding to each subject within an image in an electronic device.

The above aspects are achieved by providing a method for displaying an image combined with playing audio.

According to an aspect of the present invention, an operation method of an electronic device includes displaying an image and, when a first image object within the image is selected, outputting a first audio object corresponding to the first image object and, when a second image object within the image is selected, outputting a second audio object corresponding to the second image object.

According to an aspect of the present invention, an operation method of an electronic device includes collecting an image and audio and, on the basis of features of at least one image object extracted from the image and at least one audio object extracted from the audio, determining a corresponding relationship between the at least one image object and the at least one audio object, and storing a combination data set including image data indicating the image, audio data indicating the audio, and mapping data indicating the corresponding relationship.

According to a further aspect of the present invention, an electronic device includes a display unit and a processor. The display unit displays an image. The processor controls to, when a first image object within the image is selected, output a first audio object corresponding to the 1st image object and, when a second image object within the image is selected, output a second audio object corresponding to the second image object.

According to a yet another aspect of the present invention, an electronic device includes a processor and a storage unit. The processor collects an image and an audio and, on the basis of features of at least one image object extracted from the image and at least one audio object extracted from the audio, determines a corresponding relationship between the at least one image object and the at least one audio object. The storage unit stores a combination data set including image data indicating the image, audio data indicating the audio, and mapping data indicating the corresponding relationship.

According to a still another aspect of the present invention, an electronic device includes a memory, a processor, and a display unit. The memory stores at least one software module. The processor executes the at least one software module stored in the memory. The display unit displays an image according to the control of the processor. The at least one software module includes at least one instruction set of controlling to, when a first image object within the image is selected, output a first audio object corresponding to the first image object and, when a second image object within the image is selected, output a second audio object corresponding to the second image object.

According to a still another aspect of the present invention, an electronic device includes a memory and a processor. The memory stores at least one software module. The processor executes the at least one software module stored in the memory. The at least one software module includes at least one instruction set of controlling to collect an image and an audio and, on the basis of features of at least one image object extracted from the image and at least one audio object extracted from the audio, determine a corresponding relationship between the at least one image object and the at least one audio object, and store a combination data set including image data indicating the image, audio data indicating the audio, and mapping data indicating the corresponding relationship.

According to a still another aspect of the present invention, a computer-readable storage medium is provided. The storage medium stores at least one program including instructions for enabling an electronic device to perform a method claimed in one of claims 1 to 50 when being executed by the electronic device. According to an aspect of the present invention, an operation method of an electronic device includes displaying a first image input through a first camera and a second image input through a second camera and, when audio is generated, determining which camera direction among the shooting directions of the first camera and the second camera it is and, based on the determined direction information, mapping the audio with an image that is input through a camera of a corresponding direction among the first image and the second image.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EMBODIMENTS OF THE INVENTION

Embodiments of the present invention will be described herein below with reference to the accompanying drawings. In the following description, well-known functions or constructions are not described in detail so as not to obscure the invention in unnecessary detail. Terms described below, which are defined considering functions in the present invention, can be different depending on user and operator's intention or practice. Therefore, the terms should be defined on the basis of the present invention throughout this specification.

The present invention relates to displaying an image and outputting an audio object corresponding to an image object that is selected within the image Below, various embodiments of the present invention describe a technology capable of combining an image and audio in an electronic device. For example, the electronic device can combine image data such as a still image and a video with audio data such as a voice, a background sound, and music to play a combination of the image data and the audio data.

The electronic device can be a portable electronic device, and can be one of a smart phone, a portable terminal, a mobile phone, a mobile pad, a media player, a tablet computer, a handheld computer, a Personal Digital Assistant (PDA), a notebook computer, a Personal Computer (PC), an electronic album, an ultra PC, a Portable Media Player (PMP), an MP3 player, and a computing system device for processing an image and audio such as a portable audio player. The electronic device can combine two or more functions among the aforementioned devices.

Figure 1:
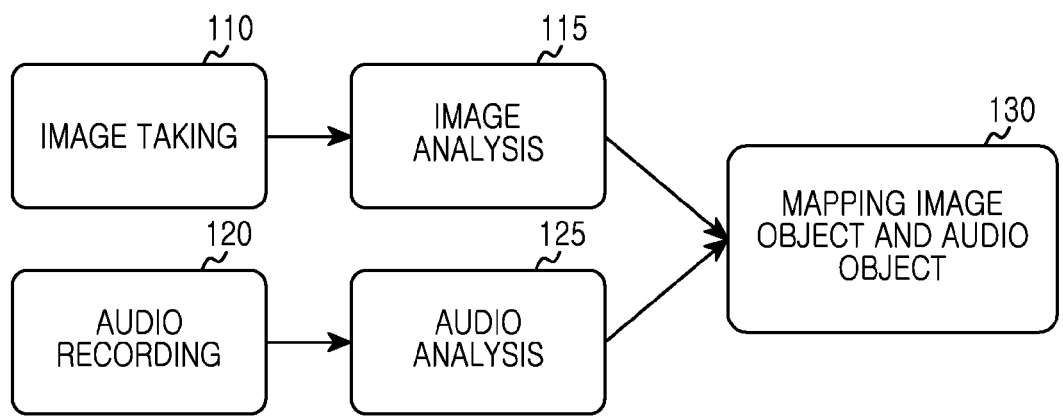
FIG. 1 illustrates an image and audio combination technique according to an embodiment of the present invention.

FIG. 1 illustrates an image and audio combination technique according to an embodiment of the present invention.

Referring to FIG. 1, the image and audio combining technique includes an image-taking operation 110, an image analysis operation 115, audio recording operation 120, audio analysis operation 125, and an image object and audio object mapping operation 130.

The image-taking operation 110 includes an generating image data by means of an imaging means provided in an electronic device, such as a camera. The audio recording operation 120 includes an making peripheral sound into data by means of a recording means provided in the electronic device, such as a microphone. The image analysis operation 115 includes an identifying image objects within a taken image, and setting an area of each image object. The image object designates one of a specific subject (e.g., a human or a thing) and a gesture within an image, and is specified as a closed-loop area within the image. For this, the image analysis operation 115 can adopt a technique such as character recognition or face recognition. The audio analysis operation 125 includes an identifying and extracting audio of each object from recorded one audio data. For more effective audio extraction, the audio analysis operation 125 can adopt a sound source processing technique such as noise removal and shutter sound removal. The mapping operation 130 includes an generating combination information about the image objects within the image and the audio objects extracted from the audio. The combination information can be configured as a form of a separate database, or a part of an image file or audio file.

As described above, an electronic device according to an embodiment of the present invention can collect and combine an image and audio. When displaying the image, the electronic device according to the embodiment of the present invention can output the audio using the image and audio combination information.

For convenience of description, an 'image object' denotes an image unit extracted from the collected entire image, an 'audio object' denotes audio unit separated from the recorded entire audio to be mapped to each image object, 'mapping data' denotes mapping information between the image object and the audio object, and a 'combination data set' denotes a bundle of the entire image, image object designation information, the entire audio, at least one audio object, and the mapping data.

Figure 2:
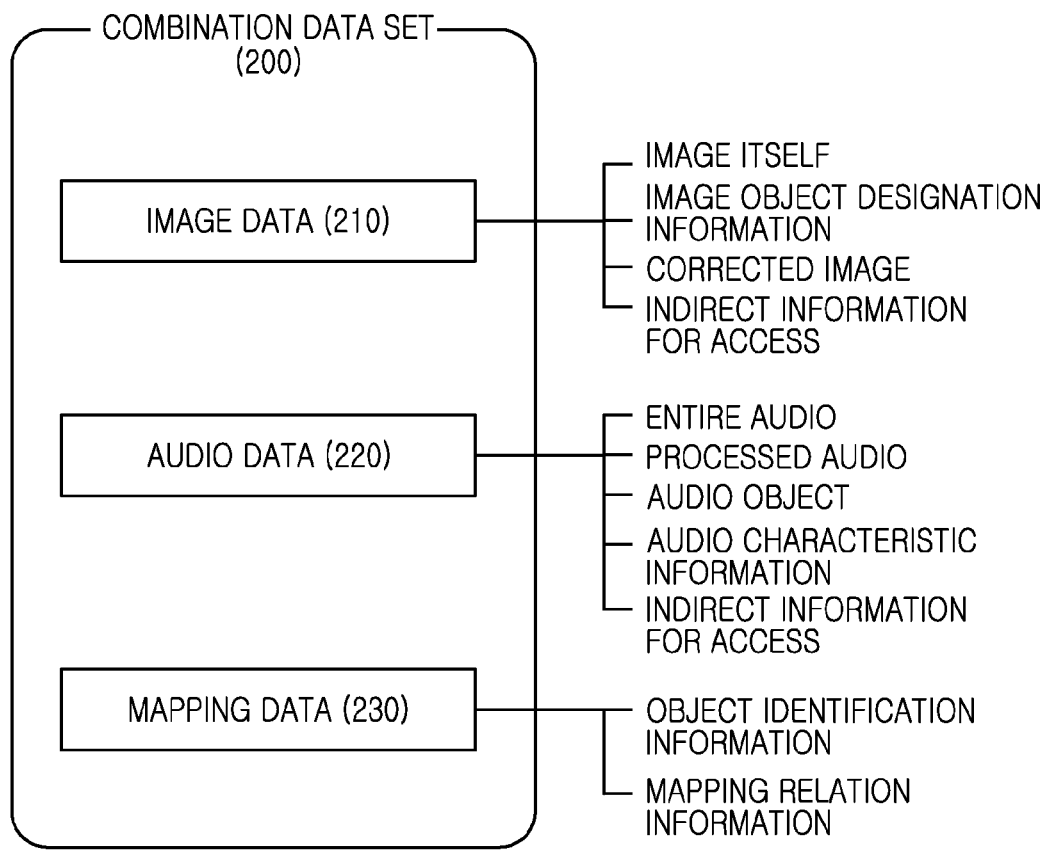
FIG. 2 illustrates a construction of data combining an image and audio generated in an electronic device according to an embodiment of the present invention.

FIG. 2 illustrates a construction of data combining an image and audio generated in an electronic device according to an embodiment of the present invention.

Referring to FIG. 2, the combination data set 200 includes image data 210, audio data 220, and mapping data 230.

The image data 210 includes a taken image (i.e., an image that has been taken), and image related data generated from the taken image. For example, the image data 210 includes a taken image, image object designation information, a corrected image, and indirect information for accessing the image data. The image object designation information includes pixel coordinates of an area including a corresponding image object in the entire image. If the area is of a form of a circle, the image object designation information includes a center coordinate and a radius length. If the area is of a rectangular form, the image object designation information includes coordinates of the left upper corner and the right lower corner, and coordinates of the right upper corner and the left lower corner.

Alternately, the image object designation information includes coordinates of pixels within a face area or coordinates of boundary line pixels of a silhouette. The image object designation information may also include a name of an image object or an identifier thereof. The corrected image represents an image applying an image processing technique such as scaling, color conversion, brightness adjustment, grayscale processing, and smoothing. The indirect information includes a Uniform Resource Locator (URL) or link indicating all or part of constituent items of the image data 210.

The audio data 220 includes the recorded entire audio, a processed audio, at least one audio object, audio characteristic information, and indirect information for accessing the audio data. The processed audio can be audio removing a noise or a shutter sound, for example, through a noise removal technology and a technology such as background sound separation and an echo remover. Alternately, the processed audio can be audio removing a bundle duration. The audio object is a unit corresponding to one image object. The audio object can be one audio file or a partial duration within the audio file. The audio characteristic information includes a frequency band of each audio object, a pattern of a sound wave or frequency, a pitch, a rhythm, a tone, a white noise, a bundle duration, an amplitude, a wavelength, an intonation, an accent, or articulation combination. The indirect information includes a URL or link indicating all or part of constituent items of the audio data 220.

The mapping data 230 includes object identification information and corresponding relationship information. The object identification information represents identification information about at least one image object and at least one audio object. The corresponding relationship information represents a corresponding relationship between the image object and the audio object.

To configure the combination data set 200 as illustrated in FIG. 2, the electronic device takes an image and records audio, thus collecting the image and the audio. The electronic device can collect the image and the audio as follows.

According to an embodiment of the present invention, the electronic device can store audio that is input while an image is being taken. While the electronic device operates in an image-taking mode by a user's instruction, the electronic device continuously displays a preview screen. While the preview screen is displayed, the electronic device temporarily stores audio that is input through a microphone. If a shutter is pressed in a preview screen display state, the electronic device captures an image input through an image sensor at a shutter press time point, and stores the temporarily stored audio at a time point at which the image is captured. A duration of the stored audio can be different according to an embodiment of the present invention.

Figure 3:
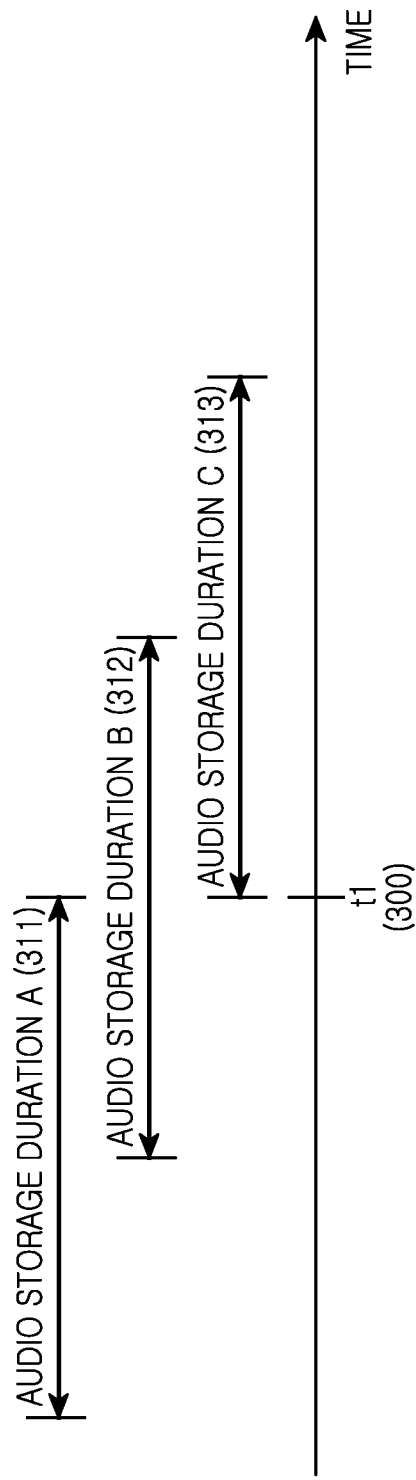
FIG. 3 illustrates an example of an image capturing time point and audio storage duration in an electronic device according to an embodiment of the present invention.

FIG. 3 illustrates an example of an image capturing time point and audio storage duration in an electronic device according to an embodiment of the present invention. Referring to FIG. 3, a shutter is pressed at a time point (t1) 300, and an image is captured at the time point (t1) 300. Audio storage duration can be one of audio storage duration A 311 having the time point (t1) 300 as an ending point, audio storage duration B 312 including before and after the time point (t1) 300, and audio storage duration C 313 having the time point (t1) 300 as a starting point. Though not illustrated in FIG. 3, the audio storage duration can be a duration that is separated from the time point (t1) 300 by a predetermined time.

According to another embodiment of the present invention, the electronic device can collect an image and audio using a video taking function.

The electronic device takes a video including audio, ends the video taking by means of a maximum record capacity or time dependent automatic end or a user's interruption instruction input, extracts at least one image from frames within a video track constituting a video, and collects audio from audio track.

Figure 4:
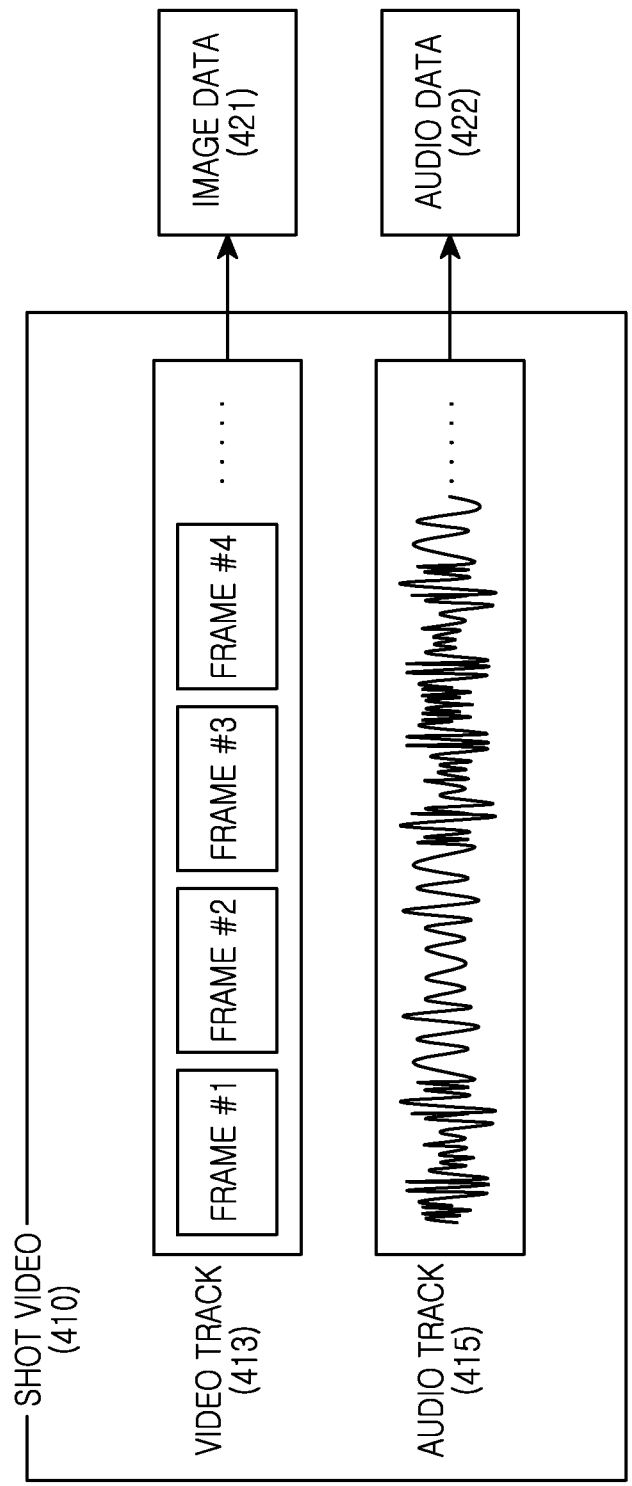
FIG. 4 illustrates an example of collecting an image and audio from a video in an electronic device according to an embodiment of the present invention.

FIG. 4 illustrates an example of collecting an image and audio from a video in an electronic device according to an embodiment of the present invention. Referring to FIG. 4, a shot video 410 includes a video track 413 and audio track 415. The video track 413 includes a plurality of frames (frame #1, frame #2, frame #3, . . . frame #n). The electronic device generates image data 421 by extracting at least one image from the video track 413, and generates audio data 422 from the audio track 415.

In a method of extracting the image, the electronic device extracts at least one image from a video. The extracted image includes an Intra-frame (I-frame), frames of a duration where a movement of more than a reference occurs, or frames disposed at a predetermined time interval. After evaluating an image quality of focusing, image contrast, noise rate, brightness, and definition, for example, the electronic device extracts at least one good image of more than a reference. The electronic device can synthesize or overlay a plurality of images to determine an average image, or generate one or more converted images through an image quality improvement algorithm.

In a method of collecting the audio, the electronic device can collect the audio by separating and encoding audio track.

The electronic device can remove a bundle duration of more than a predetermined period of time from the audio.

According to an embodiment of the present invention, the electronic device can store an image that is input during audio recording.

The electronic device starts audio recording according to a start instruction by means of a user interface. During the audio recording, the electronic device takes one or more images. The image-taking can be performed automatically in compliance with a predefined rule, or according to a user's instruction. For example, in an automatic scheme, the predefined rule includes when a speaker begins moving a mouth and audio input is initiated, when a voice of a new speaker or a new type of audio is input, or when a face is recognized. For another example, in a manual scheme, the image-taking can be performed when a thing or human's face area displayed on a preview screen is touched or clicked, and when a camera button or key is pressed.

To collect audio of excellent quality, the electronic device can remove a shutter sound generated at image-taking. For this, the electronic device can remove the shutter sound when a shutter sound generated at camera shooting is input to audio input means such as a microphone, or can remove the shutter sound through post processing of a recorded audio.

The shutter sound is generated by playing a sound source corresponding to the shutter sound in the electronic device, or by pressing a mechanical shutter button. When the shutter sound is generated by the playing sound source, the electronic device know when the shutter sound occurs and a signal pattern of the shutter sound. Therefore, the electronic device can remove the shutter sound through a noise removal technology or a technology such as an echo remover. In detail, a processor forwards information about a shutter sound source to an audio analysis unit, whereby a shutter sound among an audio signal which is input through an audio input device can be removed. When the shutter sound is generated by the mechanical operation, the electronic device stores a pattern of an audio signal of the mechanical sound in a memory, and removes an audio signal of a corresponding mechanical sound from an audio signal which is input through the audio input device in response to a corresponding input signal when a shutter button is pressed.

According to another embodiment, the electronic device can remove the shutter sound in a post-processing method of searching and removing audio signal pattern of a shutter sound from audio that is recorded when including a shutter sound.

According to a further embodiment, to disable the shutter sound or mechanical sound to be input or stored in the audio input device, the electronic device can sense the shutter sound, and stop recording audio while the shutter sound is generated. Alternately, while the shutter sound is generated, the electronic device may not record a sound of a pitch zone to which the shutter sound belongs.

After collecting the image and the audio, the electronic device according to an embodiment of the present invention extracts at least one image object from the image and at least one audio object from the audio, and determines a corresponding relationship between the at least one image object and the at least one audio object.

The electronic device can perform noise removal from the collected audio, voice separation by speaker, background sound separation, and background sound removal, for example. The electronic device identifies audio generation area on the image. For example, upon generation of a movement or sound source on the image, the electronic device can identify a sound source generation area based on directivity identification. The electronic device determines a corresponding relationship according to the audio and image analysis result, and stores the corresponding relationship, the image data, and the audio data.

According to an embodiment of the present invention, the electronic device can determine a corresponding relationship based on face recognition and waveform analysis.

The electronic device analyzes a collected image, and divides image objects shown in the image by means of a reference. For example, the reference can be a human or thing. If a human, the reference can be male, female, child, or young or old aged. To distinguish the human and the thing, the electronic device can use a face recognition technique. The classification result (e.g., face coordinate information within image data, face thumbnail image data, an object IDentifier (ID), and object characteristic information of male/female/child/young or old) can be stored in a header of a corresponding image file, or a separate database or file associated with the image data, for example.

Figure 5A:
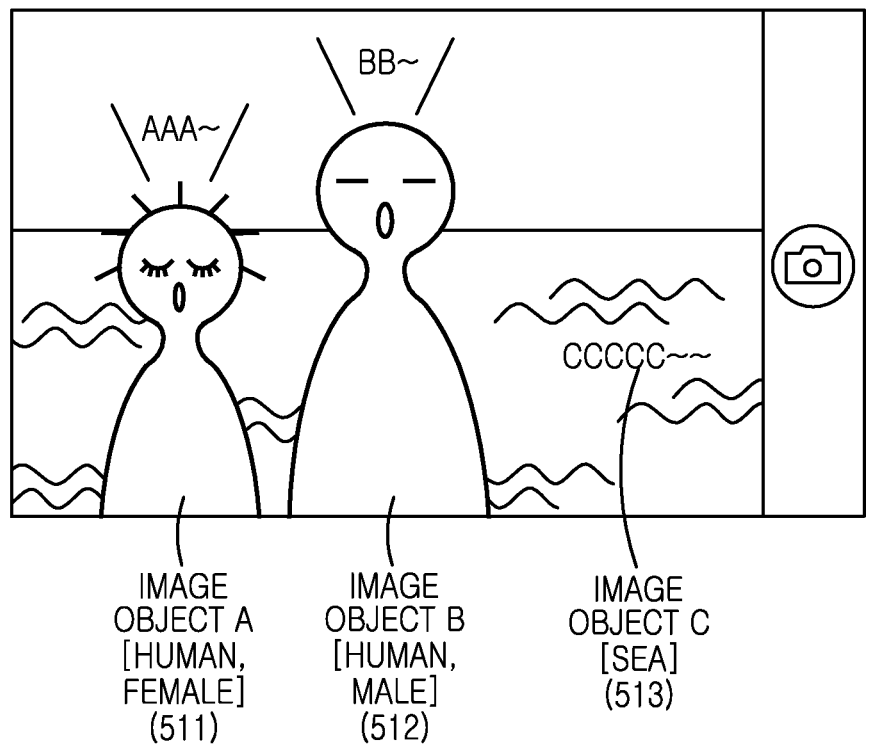
FIGS. 5A and 5B illustrate an example of extracting an image object and audio object in an electronic device according to an embodiment of the present invention.
Figure 5B:
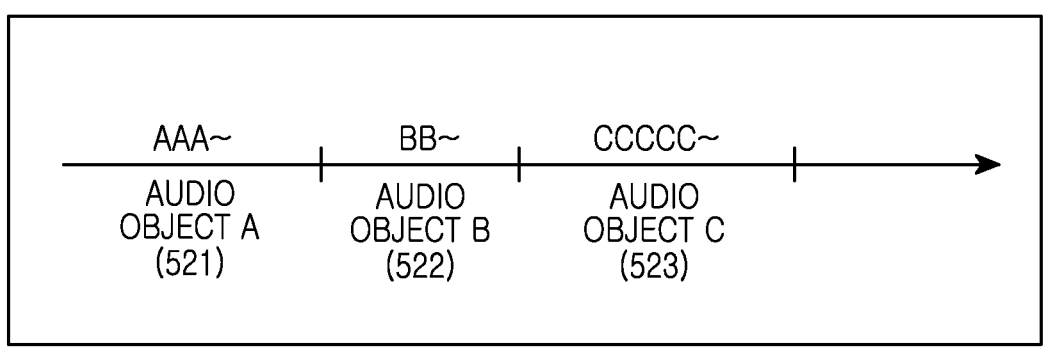

The electronic device analyzes a waveform of a collected audio, extracts audio objects on the basis of a feature of each waveform, and maps the extracted audio objects to the image objects having features corresponding to the audio objects. The waveform analysis can be performed, for example, using frequency analysis, sound rise/fall analysis, sound magnitude analysis, pitch analysis, or determination of a similarity with a typical waveform of a thing, FIGS. 5A and 5B illustrate an example of extracting an image object and audio object in an electronic device according to an embodiment of the present invention. Referring to FIGS. 5A and 5B, the electronic device analyzes image data. The electronic device separates human/thing through face recognition, and separates the human into male/female/child/young or old, based on which at least one image object is extracted. For example, the electronic device first separates an image object A 511 and an image object B 512 as human and separates an image object C 513 as sea. The electronic device then separates the image object A 511 as female and the image object B 512 as male. The electronic device then analyzes audio data. The electronic device separates a human voice/thing sound with a unique feature of a waveform through audio waveform analysis by duration. As a result, among the entire audio 'AAA~BB~C-CCCC~', 'AAA~ [high-pitched tone]' is classified as the audio object A 521, 'BB~ [low-pitched tone]' is classified as the audio object B 522, and 'CCCCC~ [wave sound]' is classified as the audio object C 523.

The electronic device maps features of the classified image objects 511, 512, and 513 with features of the classified audio objects 521, 522, and 523. According to this, the image object A [female] 511 and the audio object A [high-pitched tone] 521 are mapped with each other, the image object B [male] 512 and the audio object B [low-pitched tone] 522 are mapped with each other, and the image object C [sea] 513 and the audio object C [wave sound] 523 are mapped with each other.

According to another embodiment of the present invention, the electronic device can determine a corresponding relationship based on the movement of a character and a target.

At image-taking, the electronic device can determine a corresponding relationship with audio by means of the movement or gesture of a character or thing. For example, the electronic device identifies a location of a human whose mouth moves, a face area thereof in an image that is input through an image capture device at a time audio recording occurs, for example, a preview image, thereby being capable of determining what is a generation subject of audio being currently input. For example, the electronic device can determine that the generation subject of the audio being currently input is an image object that is observed as being currently moved.

Additionally, the electronic device can register and store a corresponding relationship between area information of an image object or information (e.g., a name or an ID) by face or thing recognition, and audio being input.

According to a further embodiment of the present invention, the electronic device can determine a corresponding relationship based on directivity information of audio.

Upon audio recording, the electronic device can determine the direction of a sound source, and determine an image object generating the audio on the basis of the direction or the directivity information. For example, if a stereo microphone is disposed at one side of the electronic device, the electronic device can determine the approximate direction of the sound source. The electronic device can identify a coordinate of an image object corresponding to the sound source from an input image, and can determine a corresponding relationship between the image object and audio object that is input. For example, when one character is identified at the left side of the image and the direction of an input audio is determined as being the left side, the electronic device can define as one image object the character identified at the left side, and map the image object with the audio that is currently input.

For another example, when cameras are disposed on a front and a rear of the electronic device, respectively, and at least one microphone is provided in the electronic device to identify a sound source generated in the direction of each camera lens, the electronic device can synthesize images input through two cameras into one image, and identify an image object corresponding to each input audio in the synthesized image. For example, a plurality of microphones can be installed in the direction of each camera lens. Although a plurality of microphones are installed irrelevant to the direction of each camera lens, by using a time difference of sound sources which are input from the plurality of microphones, the electronic device can determine the directivity of the sound sources. If an installed microphone is a directional microphone, the microphone can identify the directivity of a sound source by itself. If a Picture-In-Picture (PIP) function is supported, a background image area is input to a rear camera, and the background image area can be designated as one image object and be mapped with audio that is input to a rear microphone. A thumbnail image area exhibited through PIP is an image input through a front camera, and the thumbnail image area can be designated as one image object and be mapped with audio that is input to a front microphone.

According to a another embodiment of the present invention, if it is difficult to separate a voice of each image object in extracting audio objects from audio, the electronic device can sort a plurality of features into upper features and define the plurality of features as one group. For instance, the electronic device can sort audio objects as high-pitched tone/low-pitched tone, and group the sorted audio objects by male/female gender.

In determining a corresponding relationship between an image and audio, the corresponding relationship is not necessarily set only between the image taken and audio simultaneously recorded. For instance, the corresponding relationship can be determined even between an image and audio that are collected at different time points.

For example, the electronic device collects the first image and the first audio, and sets a corresponding relationship between the first image and the first audio through analysis operation. The electronic device collects the second image and the second audio, and analyzes the first image, the first audio, the second image, and the second audio and then sets a corresponding relationship therebetween. When a correlation between the first image and the second audio is relatively higher, the electronic device maps audio object extracted from the second audio instead of the first audio, with an image object extracted from the first image. For example, when a character A pronounces "AAA" and a character B pronounces "BBB", if the first audio includes "AAA" but the character B is taken at a first image-taking, a correlation between the first image and the first audio is low. If the second audio includes "BBB" but the character A moves at a second image-taking, a correlation between the second image and the second audio is low. In this case, a corresponding correlation between the first image and the second audio and a corresponding correlation between the second image and the first audio can be set.

For this, the electronic device determines a relative correlation through image and audio analysis, or receives the relative correlation from a user through a separate UI.

An electronic device according to an embodiment of the present invention sets a corresponding relationship between an image object and audio object in compliance with a predefined rule. Complementing this, the electronic device can provide a UI capable of setting the corresponding relationship by means of a user's instruction. In other words, the electronic device can provide the UI capable of mapping the image object and the audio object with each other. The electronic device can display a list of selectable audio objects, identify audio object selected by a user, and map the audio object with an identified image object. Alternately, when an image object is selected by a user, the electronic device can display a list of mappable audio objects, and map audio object selected by the user to the image object. For instance, the electronic device determines a corresponding relationship between the image object and audio object that are selected by the user.

An electronic device according to an embodiment of the present invention can encode and decode the collected image and audio and the determined corresponding relationship information, as a combination data set. The following will describe the encoding and decoding in detail. A file is described as an example, but a form of the combination data set of the present invention may be a bit stream.

The combination data set can be encoded into one file or a plurality of files.

Figure 6A:
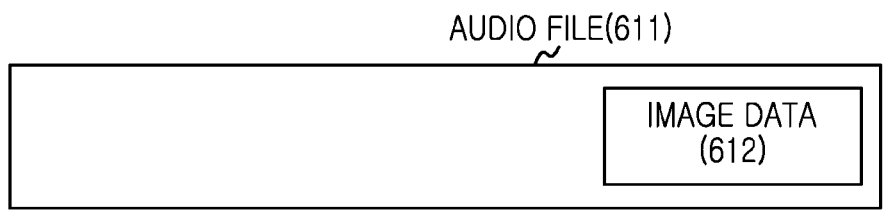
FIGS. 6A-6D illustrate examples of encoding a combination data set in an electronic device according to an embodiment of the present invention.
Figure 6B:
Figure 6C:
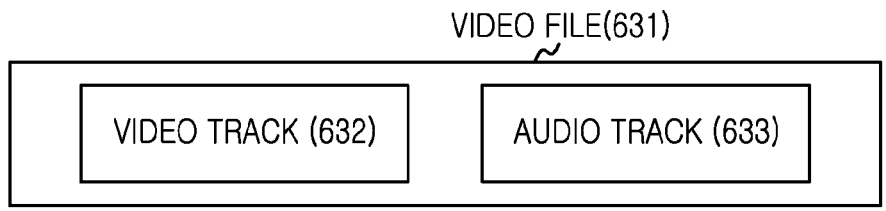
Figure 6D:
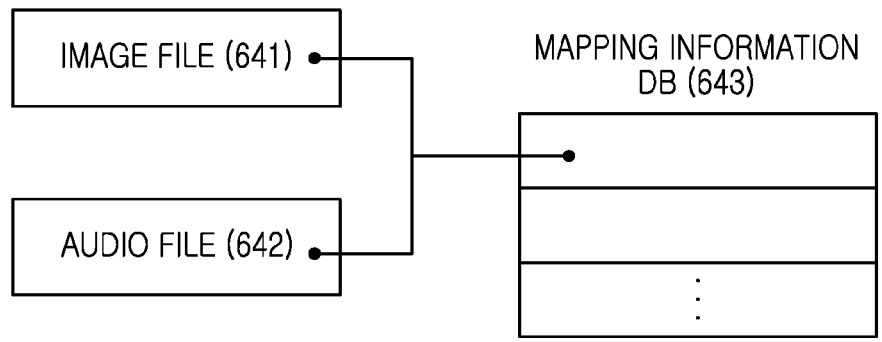

FIGS. 6A-6D illustrate examples of encoding a combination data set in an electronic device according to an embodiment of the present invention. FIG. 6A illustrates an audio file based image insertion form in which image data 612 is inserted into an audio file 611. FIG. 6B illustrates an image file based audio insertion form in which audio data 622 is inserted into an image file 621. FIG. 6C illustrates an image file and audio file synthesis form of a video file 631 format in which image data is configured as a video track 632 and audio data is configured as an audio track 633. FIG. 6D illustrates a form of adding separate mapping information data in which an image file 641, an audio file 642, and a mapping information database 643 separately exist, respectively.

When encoding and decoding of the audio file based image insertion form, the audio file based image insertion form indicates a scheme including or adding image data to a part of an audio file.

According to an embodiment of the present invention, image data can be encoded to a metadata area of the audio file. For example, in an MP3 file, the image data can be stored in an ID3 tag, which signifies a container of metadata defined in an MP3 file format. The ID3 tag generally includes information of a composer, a playing time, and an album image. To configure the combination data set, the image data can be inserted into an ID3 tag area of the MP3 file. For instance, the image data can be inserted into an album image area. Alternately, a coordinate of an image associated with audio and a face image of a speaker can be stored in the metadata area of the audio file. According to need, various operations are possible by storing at least one image data in the metadata area of the audio file.

According to another embodiment of the present invention, a separate new field for image data can be defined, not the metadata area. In this case, the electronic device stores the image data in the field newly defined for the image data. For example, the separate new field is defined in a front end of the audio file, a rear end thereof, or a specific intermediate location thereof, and the image data can be stored in the separate new field.

According to a further embodiment of the present invention, the image data can be included in a text track of the audio file, or separately provided subtitle information, such as a subtitle file.

One example of the audio file based image insertion form is to replace a still image for an album image item included in the ID3 tag area of the MP3 file. In this case, a general MP3 player displaying an album image can output audio together with an image. Services of various schemes can be provided if metadata is used. For example, if indirect information such as a Uniform Resource Locator (URL) for accessing the image data is recorded in the metadata area of the audio file, by using image data that a processor requires upon audio playing, the electronic device can read designated image data from a memory, and display an image.

When additional image data such as a coordinate of audio related area and a face image of a speaker is stored in the metadata area, audio output can be controlled by a user input on a displayed image. For example, if a coordinate on the displayed image is input, the electronic device can identify an image area related to the input coordinate. If the coordinate on the image is included in a specific area or is located within a reference distance from the specific area, the electronic device can search audio object mapped to the specific area on the basis of the metadata area, and output the searched audio object. The electronic device can recognize a thing corresponding to an input coordinate, and output audio object mapped to the thing. In a concrete example, if an area selected on an image is a character's face, the electronic device can recognize a corresponding character, and calculate a matching rate with face images of characters stored in metadata areas of audio files and character information, for example, and output a mapped audio object if the matching rate is equal to or is greater than a threshold.

The image data stored in the metadata area of the audio file can be plural. For example, one audio file can be mapped to different image objects. If the image objects are plural, each image object can designate a specific portion of a corresponding audio file.

Figure 7:
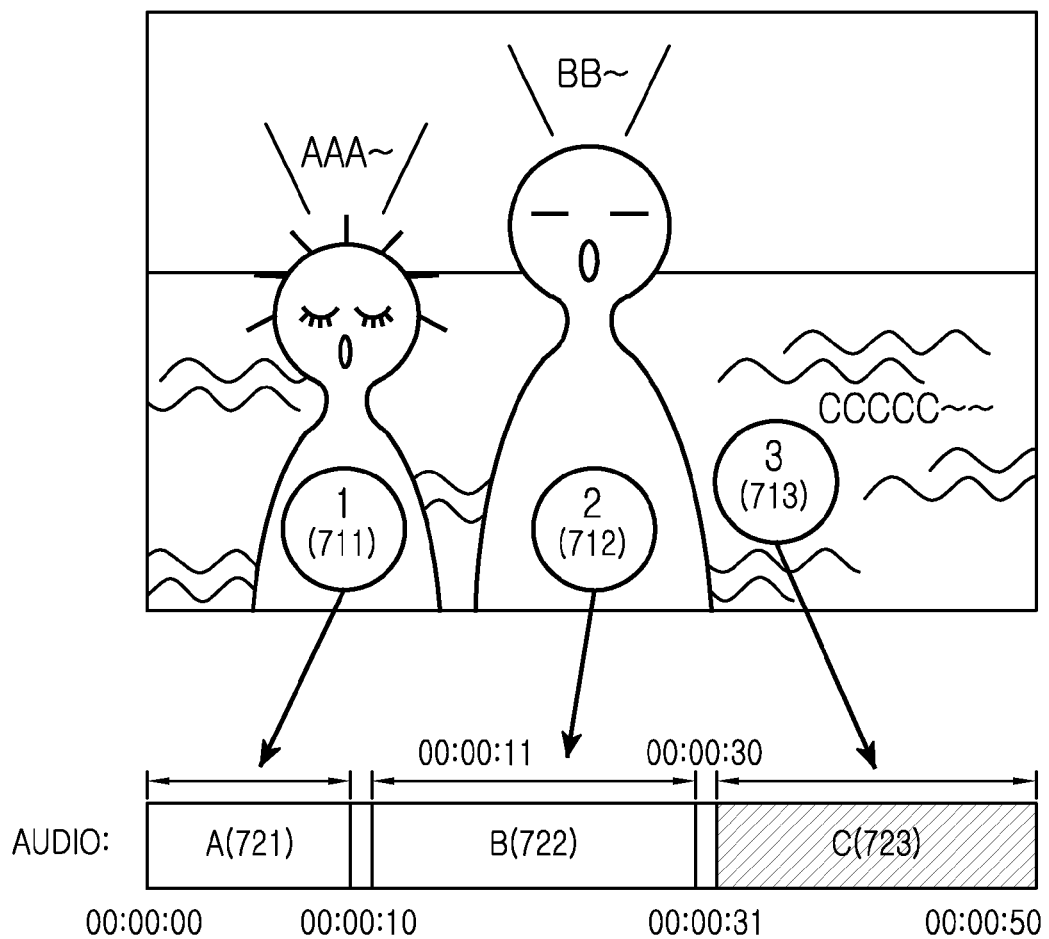
FIG. 7 illustrates an example of mapping an image object and audio object in an electronic device according to an embodiment of the present invention.

FIG. 7 illustrates an example of mapping an image object and audio object in an electronic device according to an embodiment of the present invention.

Referring to FIG. 7, a first image object 711 can be mapped with a duration A 721 from 00:00:00 of an audio file to 00:00:10, a second image object 712 can be mapped with a duration B 722 from 00:00:11 to 00:00:30, and a 3rd image object 713 can be mapped with a duration C 723 from 00:00:31 to 00:00:50. If the first image object 711 is selected by a user, the electronic device outputs audio 'AAA~' that is the duration A 721. If the second image object 712 is selected by the user, the electronic device outputs audio 'BB~' that is the duration B 722. If the 3rd image object 713 is selected by the user, the electronic device outputs audio 'CCCCC~' that is the duration C 723.

If image data is stored in a field defined for image data, which is located in a front end of an audio file, a rear end thereof, and a specific intermediate location thereof, the electronic device can display an image from the image data through an operation similar to the embodiment using the aforementioned metadata area, and output a corresponding audio object. By using image data added to a corresponding audio, the electronic device can recognize an area selected in an image, and output a different audio object according to the area. Even if the image data is stored in a text track of an audio file or separate subtitle information, the electronic device can display an image from the image data through the operation similar to the embodiment using the aforementioned metadata area, and output a corresponding audio object.

Encoding and decoding of the image file based audio insertion form is described as follows. The image file based audio insertion form indicates a scheme of including or adding audio data to an image file or a portion of an image data stream.

According to an embodiment of the present invention, audio data can be stored in a metadata area in an image file or image data. The audio data can be included in a supplementary field such as an APP area among the metadata area of JPEG File Interchange Format (JFIF) of JPEG, and EXchangable Image File format (EXIF). A separate new field for the audio data can be defined within an image file. According to this, the audio data can be stored in the field defined for the audio data. The audio data can also be stored together with mapping data. In other words, the audio data includes at least one audio object, and can be stored together with information indicating an image object mapped with the at least one audio object. According to this, a plurality of area information and a plurality of audio objects related to the area information can be stored for one image file.

If an area corresponding to a specific image object on an image is selected by a user, the electronic device searches an audio object mapped to a selected image object from audio data which is stored in a metadata area of an image file, and a field defined for the audio data, and outputs the searched audio object.

If the audio data is stored in a rear end of the image file, the electronic device can decode and display only an image, and can decode audio according to later needs. Thus, unnecessary operations are advantageously decreased. In contrast, if the audio data is located in a front end of the image file, the electronic device can rapidly search the audio.

Encoding and decoding of the image file and audio file synthesis form is described as follows. The image file and audio file synthesis form indicates a scheme of storing the combination data set in a video form, instead of an image file or an audio file.

Generally, a video file is composed of, and designed to designate a video track and an audio track. According to an embodiment of the present invention, the electronic device configures the video track using at least one image data, and then includes, in the audio track, audio data including audio objects mapped to all image objects within the image data. According to this, an image and audio can be played through a general video player. For example, the video file includes the video track composed of one or more still images and the audio track including at least one audio object mapped with image objects within the still image. If an area corresponding to a specific image object within the still image is selected, the electronic device searches a portion where an audio object mapped with the image object is located, and then plays the audio track. For example, each area corresponding to image objects serves as a shortcut of the audio track.

Encoding and decoding of the form of adding the separate mapping information data is described as follows. The form of adding the separate mapping information data signifies a scheme of separately storing an image file and an audio file and generating separate mapping information indicating a combination relationship between both the image file and the audio file.

Image data and audio data are not combined as one bundle, and a separate database indicating a combination relationship between the image object within the image data and the audio object within the audio data is generated. For example, identification information of at least one image object and identification information of at least one audio object can be stored in a database record. If an area corresponding to a specific image object is selected during image display, the electronic device can search an audio object mapped to the selected image object among image related records of a database, and output the searched audio object.

As in the aforementioned embodiments, a plurality of image objects and a plurality of audio objects can be maintained and managed in one record.

As described above, an electronic device according to an embodiment of the present invention can encode and decode a combination data set. The electronic device can remove a combination relationship between the image object and the audio object, as follows.

When image information is stored in an album image item within an ID3 tag of an MP3 file, the electronic device can remove image data by removing or covering an album image with other image. When indirect information (e.g., a URL) for the image data is stored in a supplementary metadata area within the ID3 tag of the MP3 file, the electronic device can remove the image data by removing or inactivating a value within the metadata area. When the image information is stored in a field defined for the image data, the electronic device can remove the image data by removing the field defined for the image data. When the image data is stored in subtitle information, the electronic device can remove the image data by removing an area used for the image data from the subtitle information or deleting the subtitle information.

When audio data is stored in a metadata area (e.g., an APP area among a JFIF or EXIF area of JPEG) of an image file, the electronic device can remove the audio data by initializing the corresponding area. When the audio data is stored in a specific area of the image file, i.e., in a new field defined for the audio data, the electronic device can remove the audio data by removing the field defined for the audio data. When it is encoded in the image file and audio file synthesis form, for example, when it is encoded into a video file, the electronic device can remove a combination data set by separating a video into audio track and a video track and separating and encoding the video into audio file and a video file.

When generating a separate database indicating a corresponding relationship, the electronic device can remove the combination data set by removing a corresponding record from the database, inactivating the corresponding record, or deleting related mapping information.

An electronic device according to an embodiment of the present invention can provide functions by using the combination data set as follows.

Figure 8A:
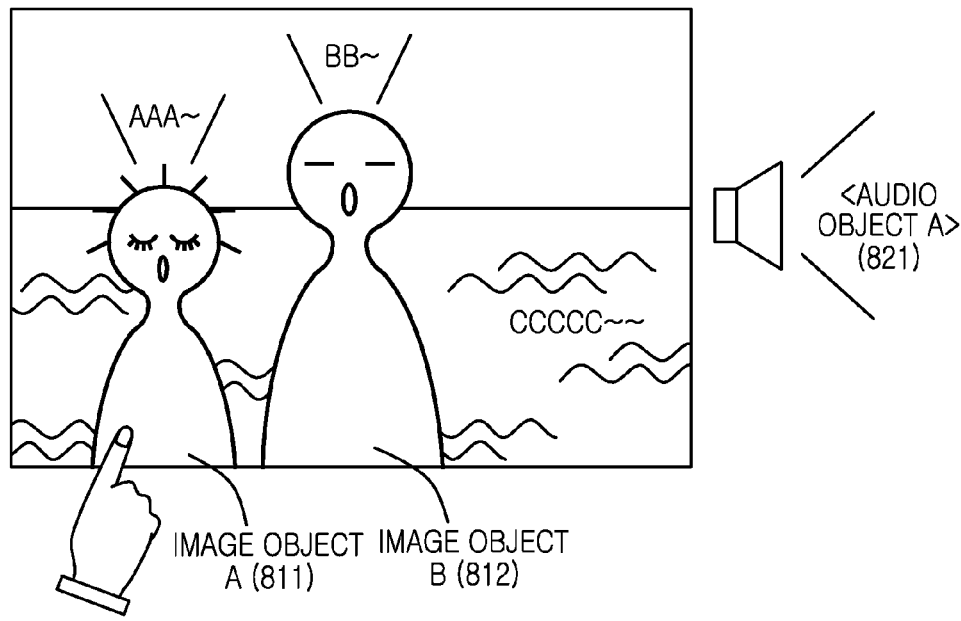
FIGS. 8A and 8B illustrate an example of outputting audio object by image object in an electronic device according to an embodiment of the present invention.
Figure 8B:
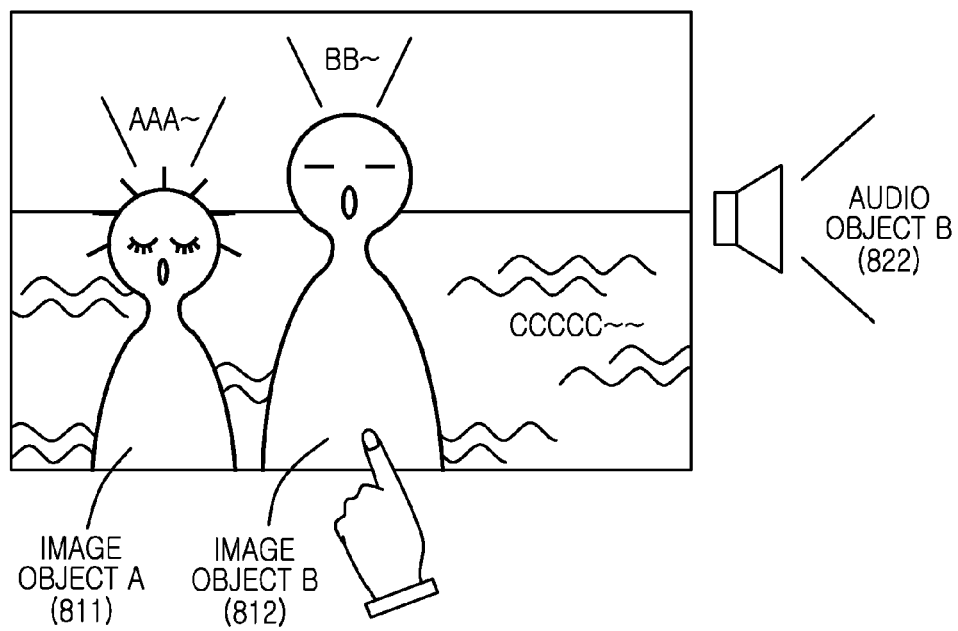

FIGS. 8A and 8B illustrate an example of outputting audio object by image object in an electronic device according to an embodiment of the present invention.

Referring to FIGS. 8A and 8B, an image is displayed, and includes an image object A 811 and an image object B 812. As in FIG. 8A, if selection of the image object A 811 occurs, the electronic device outputs audio object A 821 mapped with the image object A 811. As in FIG. 8B, if selection of the image object B 812 occurs, the electronic device outputs audio object B 822 mapped with the image object B 812.

As in FIGS. 8A and 8B, when the user selects an area corresponding to a specific image object, the electronic device identifies the image object corresponding to the selected area, and outputs an audio object mapped to the image object. For example, the selection can be defined as an event of a touch, a click, or a drag. For another example, the selection can be defined as a voice input or text input for a name of a corresponding image object or an identifier thereof.

A reference for determining a selected image object can be defined in various manners. For example, if a coordinate of occurrence of an event is included within an area corresponding to a specific image object, the electronic device can determine that selection occurs. Alternately, the electronic device can search at least one pre-registered area existing within a predetermined distance from the coordinate of occurrence of the event, and determine that an image object corresponding to an area located closest to the at least one pre-registered area has been selected. Alternately, the electronic device can analyze an image centering on an image area in which an event occurs, extract such information as a face area of a character, a silhouette area of the character, an area of a thing on the image, and a background area, determine a matching rate with a pre-registered image object, search at least one image object whose matching rate is equal to or is greater than a threshold, and determine that an image object having the highest matching rate has been selected. If recognizing a face or a specific thing, the electronic device can acquire information such as a name and an ID from a database, and then determine that a corresponding image object has been selected. The image object can designate a specific subject or specific gesture within an image.

Figure 9:
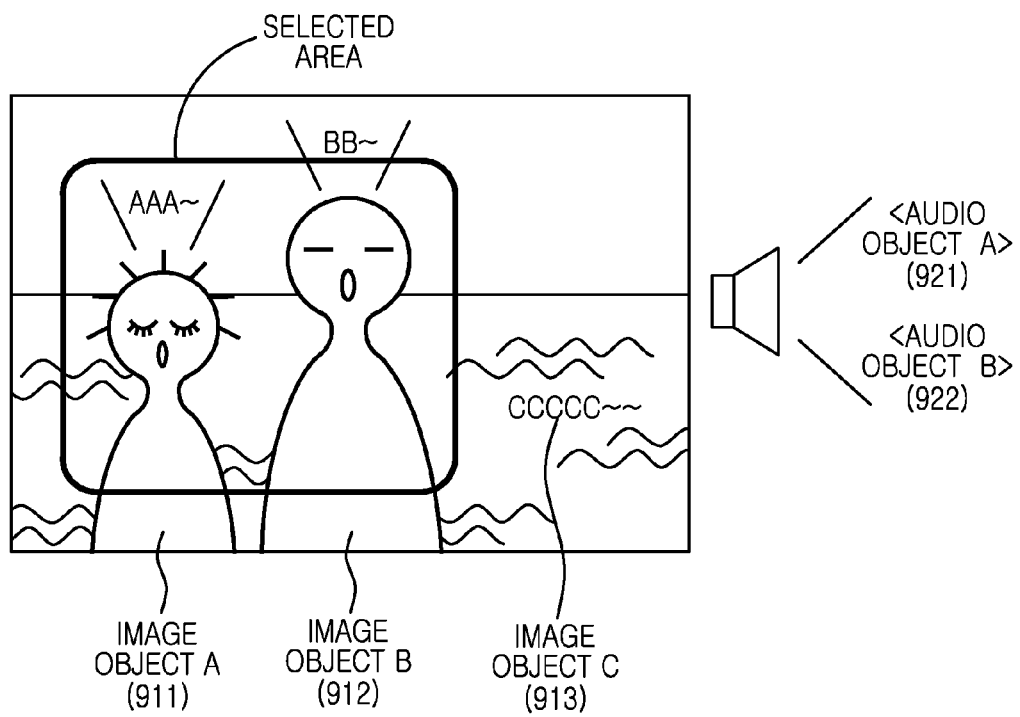
FIG. 9 illustrates an example of, when selecting a plurality of image objects, outputting audio object in an electronic device according to an embodiment of the present invention.

FIG. 9 illustrates an example of audio object output upon selection of a plurality of image objects in an electronic device according to an embodiment of the present invention.

Referring to FIG. 9, an image includes an image object A 911, an image object B 912, and an image object C 913. The image object A 911 is mapped with audio object A 921, and the image object B 912 is mapped with audio object B 922, and the image object C 913 is mapped with audio object C. When a plurality of image objects, e.g., the image object A 911 and the image object B 912 are selected on the displayed image, the electronic device outputs audio objects mapped with the selected image objects, for example, outputs the audio object A 921 and the audio object B 922. The selection of the plurality of image objects can be achieved by multi touch or area selection, for example. The electronic device can simultaneously output the audio object A 921 and the audio object B 922 by multi thread, or output the audio object A 921 and the audio object B 922 in sequence. Upon sequential output, the audio object A 921 and the audio object B 922 can be partially overlapped. Upon sequential output, an output sequence of the audio object A 921 and the audio object B 922 can accord to pre-designated order or audio storage time order.

Figure 10:
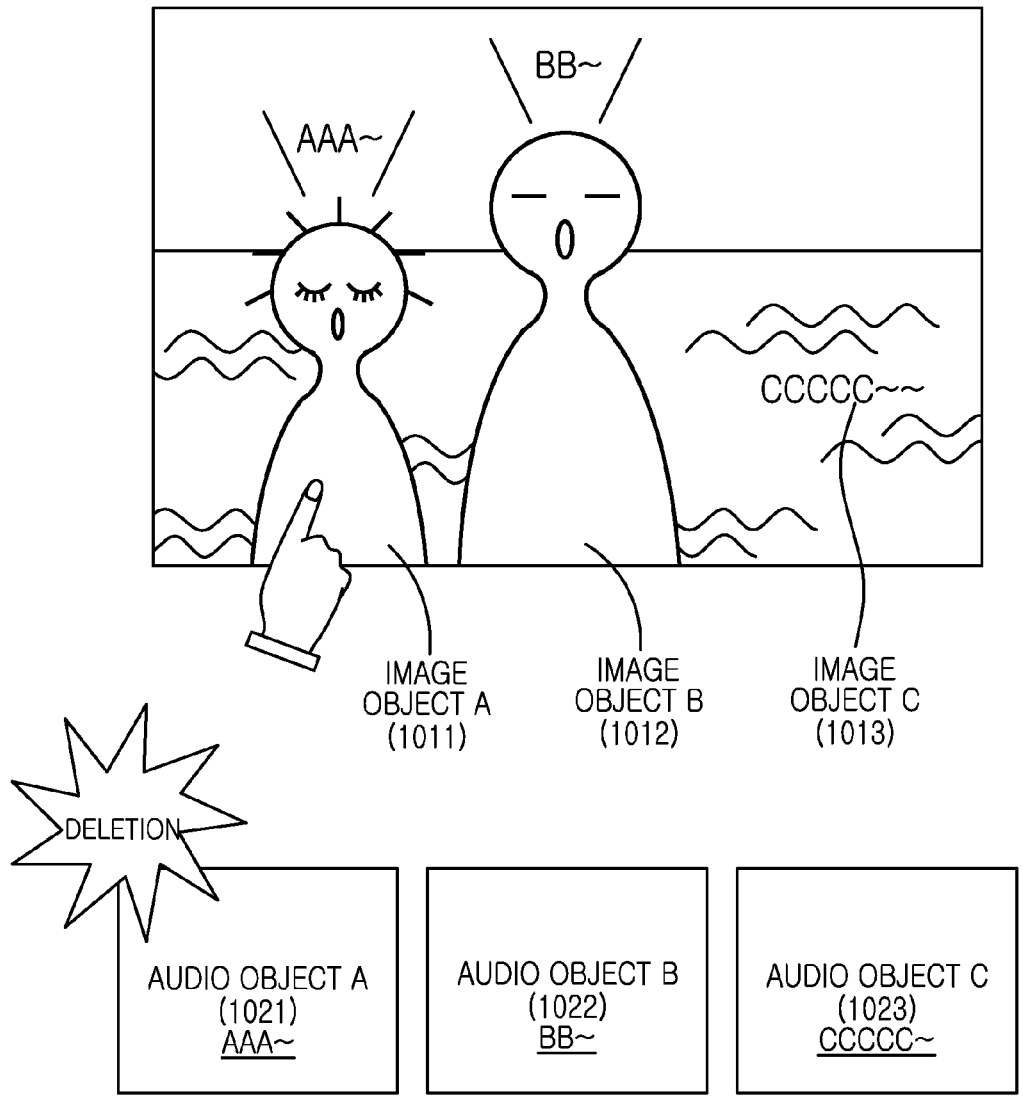
FIG. 10 illustrates an example of deleting audio object in an electronic device according to an embodiment of the present invention.

FIG. 10 illustrates an example of deleting an audio object in an electronic device according to an embodiment of the present invention.

Referring to FIG. 10, an image includes an image object A 1011, an image object B 1012, and an image object C 1013. The image object A 1011 is mapped with audio object A 1021, and the image object B 1012 is mapped with audio object B 1022, and the image object C 1013 is mapped with audio object C 1023. The image object A 1011 is selected by a user. According to this, the electronic device deletes the audio object A 1021 mapped with the image object A 1011.

Deletion of an audio object through image object selection can be performed in a deletion mode defined for predefined audio object deletion. The electronic device can enter the deletion mode through a separate menu, or temporarily enter the deletion mode by inputting a specific pattern (e.g., pressing a specific image object during a predetermined time or longer). Upon image object selection in the deletion mode, the electronic device can display a UI (e.g., a popup window) of inquiring deletion or non-deletion, and then delete a corresponding audio object, if deletion is selected.

Figure 11:
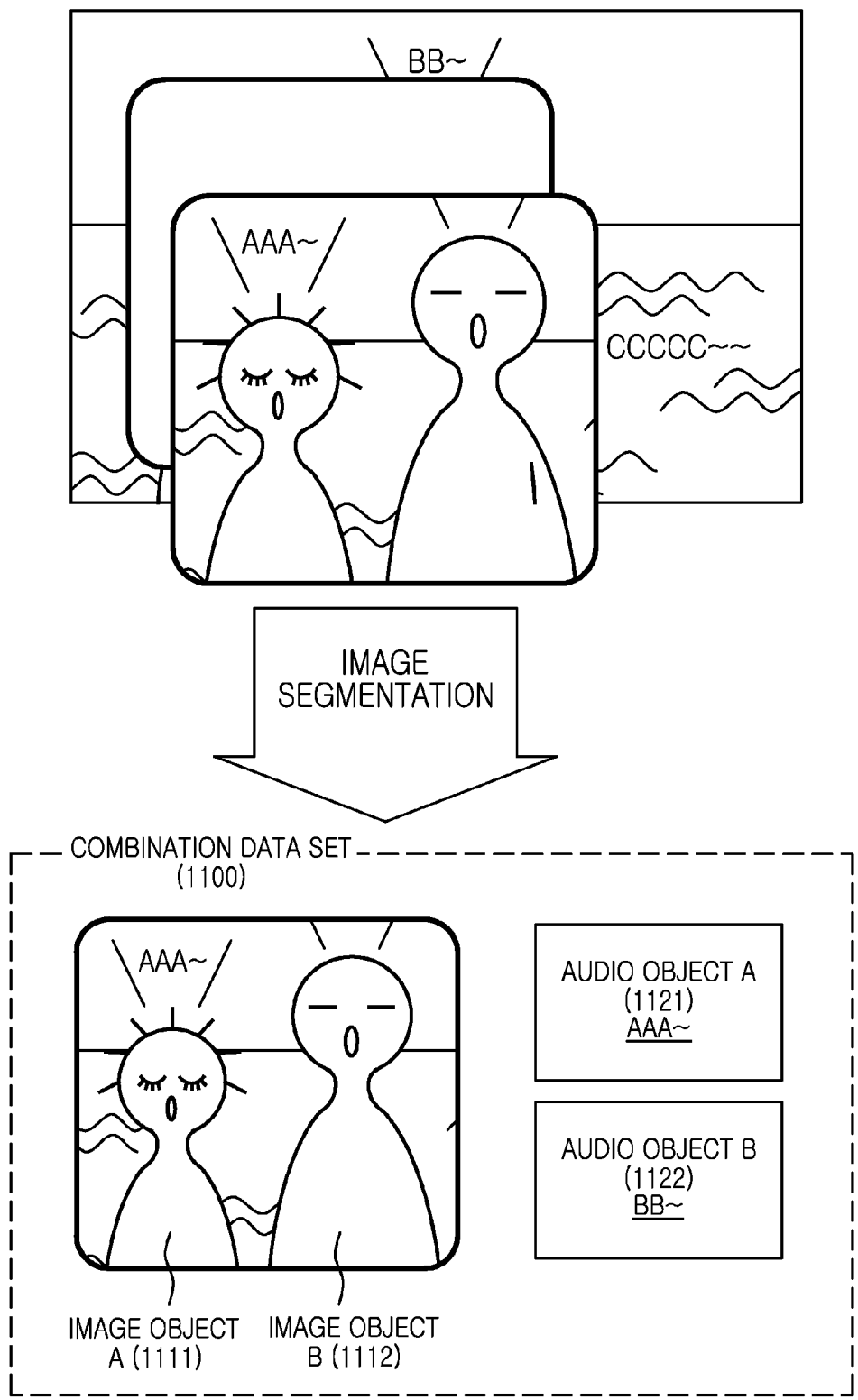
FIG. 11 illustrates an example of image object and audio object segmentation dependent on image segmentation in an electronic device according to an embodiment of the present invention.

FIG. 11 illustrates an example of image object and audio object segmentation dependent on image segmentation in an electronic device according to an embodiment of the present invention.

Referring to FIG. 11, a portion including an image object A 1111 and an image object B 1112 among the entire image is segmented from the entire image through copy or paste, resulting in the generation of a new combination data set 1100. The combination data set 1100 includes the image object A 1111 and the image object B 1112, and includes even audio object A 1121 and audio object B 1122 which are mapped together with the original image.

Figure 12:
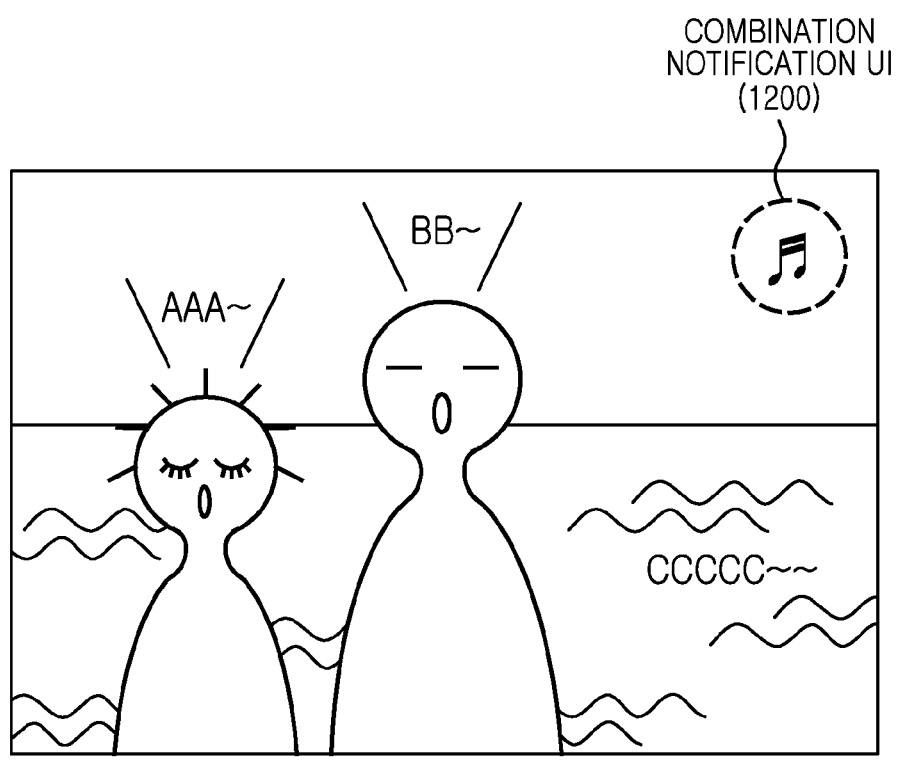
FIG. 12 illustrates an example of a User Interface (UI) of informing that an image is combined with audio in an electronic device according to an embodiment of the present invention.

FIG. 12 illustrates an example of a UI of informing that an image is combined with audio in an electronic device according to an embodiment of the present invention.

As in FIG. 12, when playing combination data generated as above, the electronic device can display a UI of informing that an image and audio have been combined with each other. In FIG. 12, the UI 1200 of informing that the image and the audio have been combined with each other has a shape of a musical note. Alternatively, the UI 1200 of informing that the image and the audio have been combined with each other can be defined as a different shape.

Figure 13:
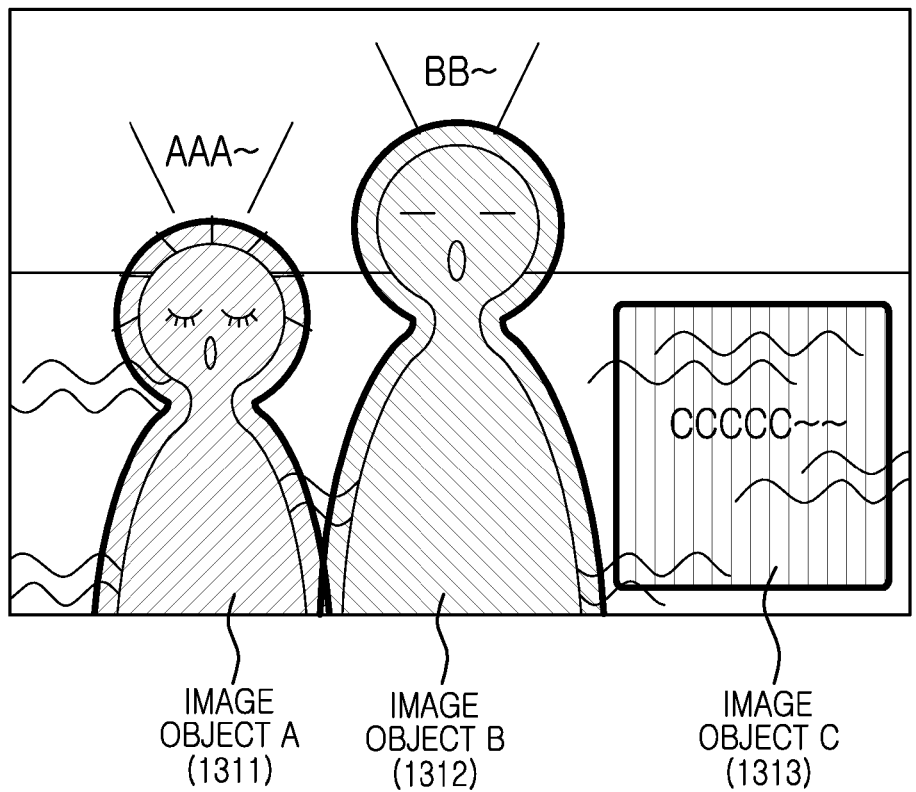
FIG. 13 illustrates an example of separating and displaying an image object in an electronic device according to an embodiment of the present invention.

FIG. 13 illustrates an example of separating and displaying an image object in an electronic device according to an embodiment of the present invention.

Referring to FIG. 13, an image includes an image object A 1311, an image object B 1312, and an image object C 1313. The electronic device can display an image object mapped with an audio object such that the image object is distinguishable from the other areas within the image, by filling each of the areas corresponding to the image object A 1311, the image object B 1312, and the image object C 1313 in a specific color or a specific pattern, for example. In FIG. 13, each image object is distinguished by means of a different pattern, but can be displayed in the same pattern. Thus, a user can easily identify the image objects mapped with the audio objects.

Figure 14:
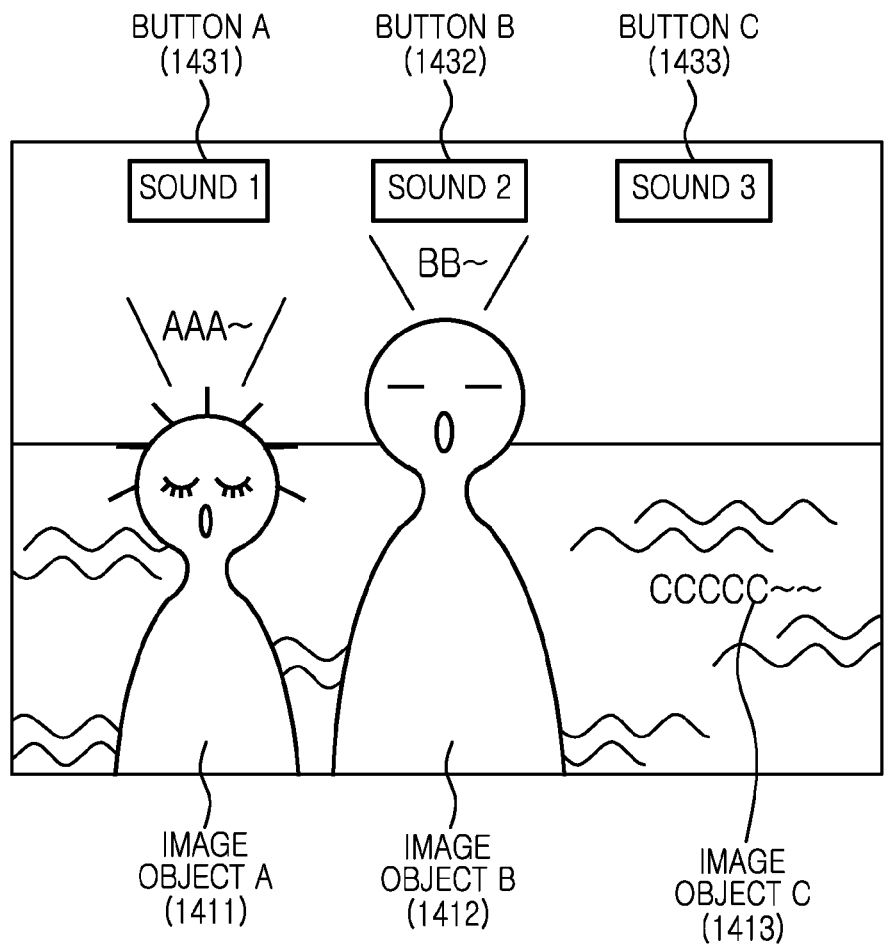
FIG. 14 illustrates an example of display of audio object output button in an electronic device according to an embodiment of the present invention.

FIG. 14 illustrates an example of display of an audio object output button in an electronic device according to an embodiment of the present invention.

Referring to FIG. 14, an image includes an image object A 1411, an image object B 1412, and an image object C 1413. The electronic device displays buttons A 1431, B 1432, and C 1433 which are defined for instructing to output an audio object mapped to each of the image object A 1411, the image object B 1412, and the image object C 1413 within the image. Accordingly, a user can output an audio object (i.e., sound 1, sound 2 or sound 3), by selecting not an image object but a corresponding button.

FIGS. 15A-15D illustrate an example of PIP screen control in an electronic device according to an embodiment of the present invention.

Figure 15A:
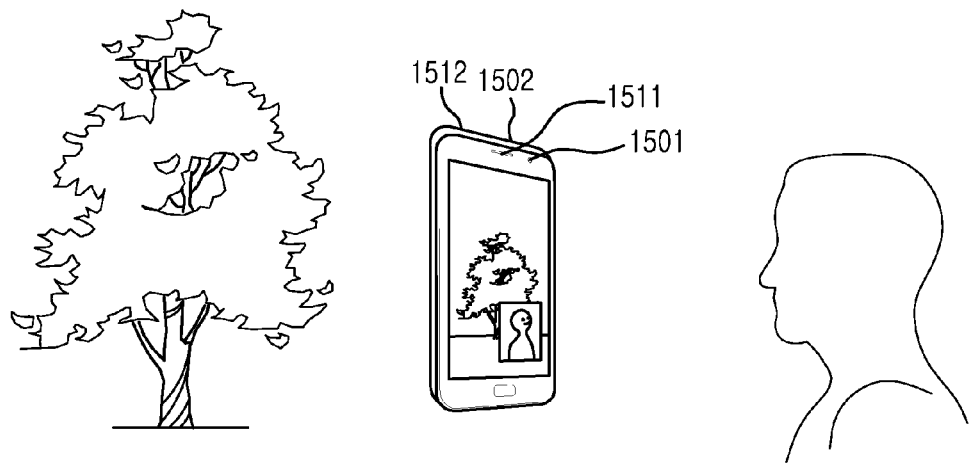
FIGS. 15A-15D illustrate an example of Picture-In-Picture (PIP) screen control in an electronic device according to an embodiment of the present invention.

Referring to FIG. 15A, the electronic device has a first camera 1501 in the front and a second camera 1502 in the rear. The electronic device provides a PIP function of providing as a wallpaper image an image input to the second camera 1502, and providing as a thumbnail image an image input to the first camera 1501.

The electronic device has a first microphone 1511 in the front and has a second microphone 1512 in the rear. Accordingly, the wallpaper image input to the second camera 1502 is mapped with audio input to the second microphone 1512, and the thumbnail image input to the first camera 1501 is mapped with audio input to the first microphone 1511.

Figures 15B, 15C, 15D:
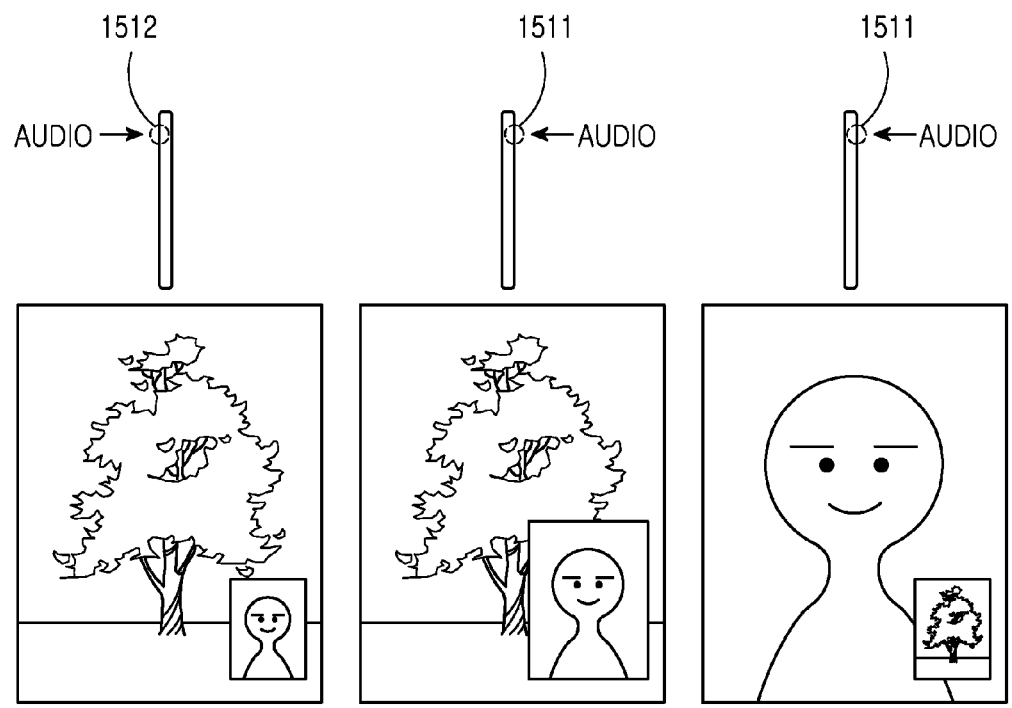

If audio is input to the second microphone 1512, as in FIG. 15B, the electronic device displays as the wallpaper image the image input to the second camera 1502, and displays as the thumbnail image the image input to the first camera 1501. In contrast, if audio is input to the first microphone 1511, as in FIG. 15C, the electronic device can display the thumbnail image input to the first camera 1501 in a larger size. If audio is input to the first microphone 1511, the electronic device can replace and display the image input to the first camera 1501 as a wallpaper image, and the image input to the second camera 1502 as a thumbnail image, as in FIG. 15D.

In FIGS. 15A-15D, the first microphone 1511 is installed on the same surface as the first camera 1501, and the second microphone 1511 on the same surface as the second camera 1502. However, the first microphone 1511 and the second microphone 1512 can be installed in locations irrelevant to the surfaces on which the first camera 1501 and the second camera 1502 are installed. By using an input time difference of a sound source input to each of the first microphone 1511 and the second microphone 1512, a volume difference thereof, or a motion such as a change or action of a mouth shape of a face image in an image input through the camera, for example, the electronic device can determine the direction of the sound source.

According to an embodiment of the present invention, prior to outputting the audio object by image object, the electronic device can output at least one time the entire audio together with image display. If a specific image object is selected during the entire audio output, the electronic device can stop the entire audio output, and output an audio object corresponding to the selected image object. If a plurality of image objects is selected, the electronic device can simultaneously output a mixture of a plurality of audio objects corresponding to the selected plurality of image objects. According to another embodiment of the present invention, if a specific image object is selected during the entire audio or plurality of audio objects output, the electronic device can mute an audio object corresponding to the selected image object.

Figure 16:
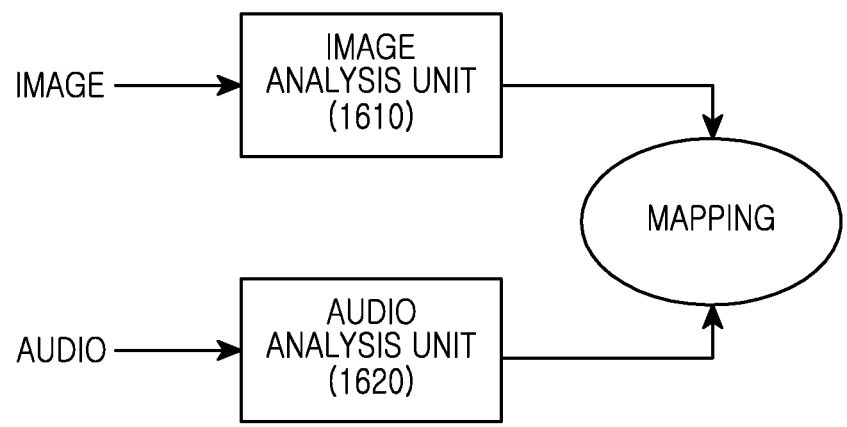
FIG. 16 illustrates a construction of a functional block for combining an image and audio in an electronic device according to an embodiment of the present invention.

FIG. 16 illustrates a construction of a functional block for combining an image and audio in an electronic device according to an embodiment of the present invention.

Referring to FIG. 16, the electronic device includes an image analysis unit 1610 for receiving and analyzing an image, and an audio analysis unit 1620 for receiving and analyzing audio.

The image analysis unit 1610 extracts and separates image objects such as a character, a thing, a face, and wallpaper from a taken image, and identifies one or more main attributes of each image object. For example, the main attribute includes a location of an object within the image, a relative location or phase between a thing/area, a shape, a color, speaker related information, and metadata. By forwarding and storing the main attribute of the identified object or area in a memory, upon occurrence of information inquiry for the image object included in the image, the image analysis unit 1610 enables a processor to receive at least one attribute information corresponding to the information inquiry from the memory and process the received attribute information. The information inquiry includes an image, audio, designation of a coordinate or area by a user input interface, and inquiry by a keyword, for example.

The image analysis unit 1610 can perform image processing for each extraction of an image object. For example, the image processing includes pre-processing, image segmentation, feature extraction, or recognition from an input image. In other words, such technology as pattern matching and machine vision can be employed.

The image analysis unit 1610 can remove unnecessary information or accelerate a processing speed by using an attribute conversion technique such as binarization, grayscale conversion, or color conversion. For example, it is more advantageous in a processing speed aspect to use a binarized black/white image rather than a color image, so as to extract a shape of a specific thing from an image. The image analysis unit 1610 can execute a digital image conversion technique of Fourier transform, discrete cosine conversion, or wavelet conversion, for example, which simplifies high-band filtering and low-band filtering and thus, simplifies process image improvement and target area extraction.

The image analysis unit 1610 can analyze information of pixels within the image to perform an image improvement technique such as blurring, sharpening, extension, contraction, noise removal, parallelization, and brightness adjustment. Due to this, a loss of main attributes such as a shape of a thing, a location thereof and a color thereof in the image is decreased or the main attributes are restored to the original, simplifying feature extraction and recognition. The image analysis unit 1610 can detect a size of a digital image or a size of a specific area and a form of a thing through boundary extraction, outline tracking, feature extraction, silhouette extraction, color separation, and area coloring algorithms, for example. Finding an outline of a digital image, distinguishing color and pattern, and determining a material feel can be helpful for image extraction, distinguishing and recognition. The image analysis unit 1610 can analyze a plurality of images for motion and gesture recognition to obtain a differential image between the different images, and investigate a movement pattern or variation of a thing to determine a movement, a motion or a gesture, for example.

The following description is made for extraction of an image object and setting of an area of the image object for user input. By applying the aforementioned image processing techniques, the image analysis unit 1610 can extract such information as a face area of a character, a silhouette of a subject, and an area of a thing such as a movement of the thing. The image analysis unit 1610 stores in a memory information such as an area range of a corresponding image object, a coordinate thereof, boundary line data, and silhouette data.

The following description is made for speaker recognition and registration. In a pre-registered speaker, the image analysis unit 1610 can determine one or more candidates from pre-registered speaker data through face recognition of an image. For example, the image analysis unit 1610 can compare face image data with registered speaker face image data. After face recognition in an image, the image analysis unit 1610 can compare a corresponding recognized information item (e.g., feature information, pattern information, or arrangement information between face image constituent things) with a pre-registered speaker data item to determine a similarity between the recognized information item and the pre-registered speaker data item, and search at least one candidate whose similarity is equal to or is greater than a threshold.

By analyzing the characteristic of the speaker, the image analysis unit 1610 can recognize ages and gender, for example. The characteristic of the speaker includes information such as a speaker's face, a body shape, a color of a costume, and an accessory form. The image analysis unit 1610 can recognize a motion of a mouth shape, a gesture from a preview image is generated, and speaker related information such as a location of a speaker of a voice related thereto is determined, as well as area information and a face image area, for example.

The following description is made for analysis of metadata of an image. By analyzing metadata stored or sensed together at image-taking, the image analysis unit 1610 can obtain additional information. For example, in a JPEG file, the image analysis unit 1610 can obtain supplementary data such as a creation date of a file stored with JFIF or EXIF, a location, a thumbnail, a resolution, and a position of an image capture device. The position includes a location of an electronic device, an angle thereof, or a slope thereof. The image analysis unit 1610 can receive sensing information such as a place of image-taking, time, brightness, and a pose of a image capture device together through a sensor device such as a Global Positioning System (GPS), a digital compass, a gyro sensor, an angular velocity sensor, a horizontal sensor, a network cell information receiver, an embedded digital watch, and an optical sensor, for example.

The following description is made for image tag setting. Additionally, the image analysis unit 1610 can configure tag information in relation with an area. For example, the tag information includes an area, a thing or character ID, coordinate information, a speaker, age, and gender.

The following description is made for face recognition include, which includes operations such as face area separation, face feature extraction, face recognition, gender and age recognition. To separate a face area, the image analysis unit 1610 first determines the existence or non-existence of a face in a given image, by using an edge image primarily, as well as brightness and color. For example, the image analysis unit 1610 applies a template such as an eclipse shape in an edge map to set a head area, and checks edge images of an eye, a mouth, and a nose in the set area. The image analysis unit 1610 can then use a top-down image interpretation method of analyzing a feature by extracting outlines of a head and a body and maintaining extracting locations of an eye, a nose, and a mouth.

To extract a face feature, the image analysis unit 1610 extracts edge, color, and brightness information using Hough's transform, a matrix's single value decomposition method, and a matching technique of a template of an eye, a nose, and a mouth, for example. To recognize the face, a Karhunen-Loeve (KL) transform-based statistic method, feature-based face constituent element geometrical analysis, Eigen face technique, Fisher's Linear Discriminant (FLD) technique, Support Vector Machine (SVM), fuzzy neural network technique, wavelet-elastic matching, side projection profile, and three-dimensional image analysis technique can be used. By using the aforementioned techniques, the image analysis unit 1610 determines a similarity between related information of a pre-registered image and a newly input image.

Even gender or ages can be estimated through face recognition. For example, the image analysis unit 1610 can normalize a detected face area image, and perform a gender estimation function by SVM for the normalized face area image. In the present invention, well-known gender recognition techniques can be used, such as disclosed in Sakarkaya, M. et al., Comparison of several classification algorithms for gender recognition from face images, Intelligent Engineering Systems, 2012 IEEE 16th International Conference on, 2012, pp. 97-101.

The image analysis unit 1610 can estimate age through regression analysis or variance analysis by normalizing a detected face area image, constructing input vectors of constituent elements within a face area from the normalized face area image, and then projecting the input vectors into a previously stored age manifold space to generate a feature vector. In the present invention, the well-known age estimation techniques can be used, such as those disclosed in Y. Fu, Y. Xu, and T. S. Huang, "Estimating human ages by manifold analysis of face pictures and regression on aging features," in Proc. IEEE Conf. Multimedia Expo., 2007, pp. 1383-1386], [paper of G. Guo, Y. Fu, T. S. Huang, and C. Dyer, "Locally adjusted robust regression for human age estimation," presented at the IEEE Workshop on Applications of Computer Vision, 2008, A. Lanitis, C. Draganova, and C. Christodoulou, "Comparing different classifiers for automatic age estimation," IEEE Trans. Syst., Man, Cybern. B, Cybern., vol. 34, no. 1, pp. 621-628, February 2004., Y. H. Kwon and N. da Vitoria Lobo. "Age classification from facial images". CVIU, 74:1-21, 1999., A. Lanitis, C. Draganova, and C. Christodoulou, "Comparing Different Classifiers for Automatic Age Estimation", IEEE Trans. SMC B, 34(1):621-8, 2004., N. Ramanathan and R. Chellappa, "Face Verification across Age Progression", IEEE Trans. on Image Processing, 15(11):3349-3361, 2006., and S. K. Zhou, B. Georgescu, X. Zhou and D. Comaniciu, "Image Based Regression Using Boosting Method," ICCV, I:541-548, 2005.

The audio analysis unit 1620 extracts at least one audio object from an input or recorded audio signal, and analyzes features of the at least one audio object. For example, the audio analysis unit 1620 extracts a voice signal from the audio signal. The audio analysis unit 1620 analyzes such information as characters of a frequency band, a sound wave or frequency pattern, a pitch, a rhythm, a tone, a white noise, a bundle duration, a magnitude, a wavelength, an intonation, an accent, and articulation combination. The audio analysis unit 1620 can provide audio processing function such as speaker information recognition, background sound separation, and noise-removal on the basis of the analyzed information. The audio analysis unit 1620 can provide a function of analyzing or recording metadata of audio data, and can additionally support voice recognition.

The following description is made for background noise removal. The audio analysis unit 1620 removes audio corresponding to a noise from audio data that is input through a microphone. For example, when a shutter sound generated at camera shooting is input through audio input device such as a microphone, the audio analysis unit 1620 can remove the shutter sound. The shutter sound is generated by playing a sound source corresponding to the shutter sound in the electronic device, or a mechanical pressing a shutter button. When the shutter sound is generated by playing of the sound source, the audio analysis unit 1620 knows when the shutter sound occurs and a signal pattern of the shutter sound. Therefore, the audio analysis unit 1620 can remove the shutter sound through a noise removal technology or a technology such as an echo remover. When the shutter sound is generated by the mechanical operation, the audio analysis unit 1620 stores a pattern of an audio signal of the mechanical sound in a memory, and removes an audio signal of a corresponding mechanical sound from an audio signal which is input through an audio input device in response to a corresponding input signal when a shutter button is pressed. For example, the audio analysis unit 1620 can remove the shutter sound in a post-processing method of searching and removing an audio signal pattern of a shutter sound from audio that is recorded when including a shutter sound. To disable the shutter sound or mechanical sound to be input or stored in the audio input device, the audio analysis unit 1620 can sense the shutter sound, and stop recording audio while the shutter sound is generated. Alternately, while the shutter sound is generated, the audio analysis unit 1620 may not record a sound of a pitch zone to which the shutter sound belongs.

The audio analysis unit 1620 can remove or extract a background sound. For example, the background sound represents a crying sound of an insect, a car running sound, a white noise, a wave sound, or music accompaniment of a song file. The background sound can be separated or removed in accordance with a reference such as a peculiar pattern or a frequency band. For example, the audio analysis unit 1620 can extract only Music Recorded (MR) using energy difference information of a frequency domain in All Recorded (AR) in which vocal and music are recorded by stereo, or may extract only a vocal sound source. Various technologies can be applied. As described above, the audio analysis unit 1620 can separate at least one voice, or remove a background sound or music from an input audio signal, or separate and extract the background sound or the music from the audio signal.

The following description is made for metadata analysis and input. In an MP3 file, a metadata area such as an ID3 tag exists and therefore, by analyzing the metadata, the audio analysis unit 1620 can acquire a variety of information. Alternately, the audio analysis unit 1620 may associate separate metadata information with audio data having no metadata area. For example, the audio analysis unit 1620 can add the metadata to audio data to generate one file or bit stream. Alternately, reference information such as a Uniform Resource Locator (URL) accessible to separate detailed metadata and an identifier of a database may be mapped to the metadata area. By using the reference information, the audio analysis unit 1620 can compose or refer separate metadata information. The metadata includes a variety of information such as a generation time, a playing length, a composer, and an album image, and the information included in the metadata can correspond to a predetermined image object on an image.

For example, the audio analysis unit 1620 can encode face image information of a speaker into an album image metadata area. If a human face area is selected on a taken image, the audio analysis unit 1620 can compare a face image of a corresponding human with the face image information of the speaker of the album image area existing in various audio data, for example, in various audio files, various audio tracks, and various audio bit streams, and search and play at least one audio data having a speaker face image corresponding to the human. As with the metadata of the image, the metadata of the audio includes location and time information. The information included in the metadata can be later combined with image data and be variously used for information search and inquiry.

The following description is made for speaker recognition for a voice signal and speaker related information input. The audio analysis unit 1620 can recognize one or more speaker related information through voice signal analysis. The speaker recognition is different from recognizing literal meaning in a voice signal. The audio analysis unit 1620 may recognize each speaker, or recognize a group to which the speaker belongs. In speaker recognition, the audio analysis unit 1620 can analyze a characteristic of a voice signal using a speaker database pre-registered to a memory. If a similarity is equal to or is greater than a threshold, the audio analysis unit 1620 can deduct one or more candidate speakers from the speaker database. By using one or more voice signal characteristic information, the audio analysis unit 1620 can determine a matching rate with the voice signal characteristic information of the database. In group recognition, the audio analysis unit 1620 can analyze a voice signal to determine information such as ages of a speaker pronouncing a corresponding voice, and gender thereof. Speaker recognition may be needed for recognizing each speaker. By previously analyzing and storing a feature of a speaker voice audio signal in a memory, the audio analysis unit 1620 can determine whether a similarity with a result of analyzing a feature of a later input voice audio signal is high. For example, while a phone call is made, the audio analysis unit 1620 can collect a counterpart's voice signal feature. In other words, the audio analysis unit 1620 can record a call voice when a user commonly makes a phone call and use the recorded voice as basic data of speaker analysis. In recognizing the speaker, audio signal analysis is not necessarily needed. For example, by comparing a speaker related feature obtained through the image recognition with the audio signal feature, the audio analysis unit 1620 can recognize the speaker. By recognizing a speaker's voice to interpret literal meaning, the audio analysis unit 1620 may obtain information of a speaker or other humans in the area.

The following description is made for directive/directional audio recognition and processing. When the electronic device has a voice input device capable of determining direction such as a directional microphone or two or more microphones, the audio analysis unit 1620 can process audio signal using the directivity of audio. For example, in taking a video, front and rear audios can be all input because a plurality of microphones are disposed to face the front and the rear, and the audio analysis unit 1620 can determine from which direction the direction of a sound source originates. In another example, when two or more microphones are spaced apart and disposed on one surface of the electronic device according to a reference, the audio analysis unit 1620 can recognize the direction in which audio is generated in more detail, by analyzing a magnitude of audio signal input in the corresponding direction, an input time thereof, and a pattern difference thereof. For example, when audio is generated in a direction in which a camera lens faces, the audio analysis unit 1620 can determine a direction in which a speaker is located, such as left, right, up, down, left up, right up, right down, and left down. In associating directivity information with speaker location information together through image analysis, speaker related information can be accurately specified in more detail. The audio analysis unit 1620 can amplify a target audio signal through directivity information analysis. For example, when several sound sources are simultaneously input or are partially overlapped and input, the audio analysis unit 1620 can amplify or separate a voice audio of a specific speaker from other sound sources, by directivity information.

The audio analysis unit 1620 can determine audio input sequence or time and, by processing audio data according to this, provide various functions. For example, audio play sequence, speaker separation, and association with image data can be provided.

Figure 17:
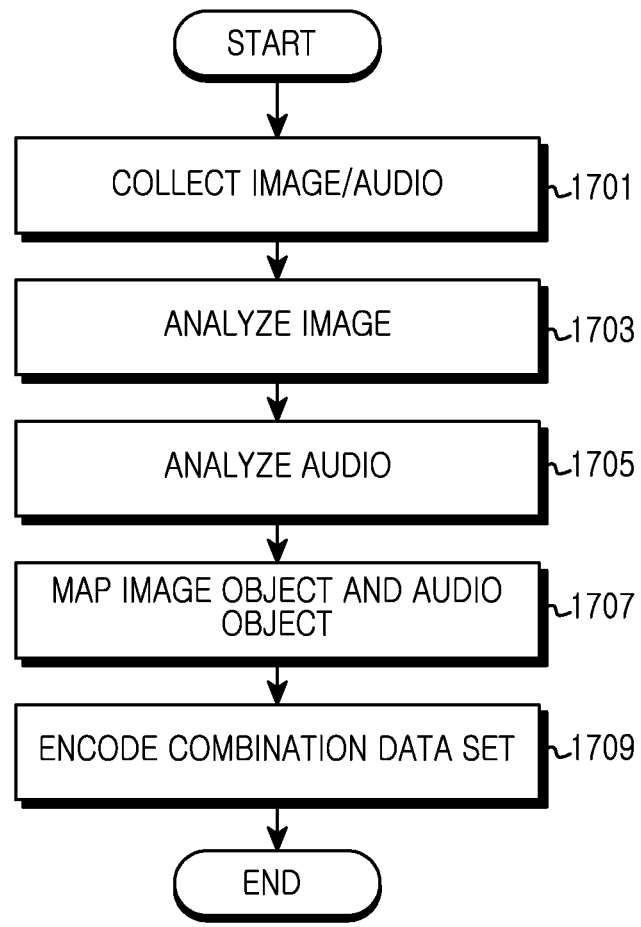
FIG. 17 illustrates an operation procedure of combining an image and audio in an electronic device according to an embodiment of the present invention.

FIG. 17 illustrates an operation procedure of combining an image and audio in an electronic device according to an embodiment of the present invention.

Referring to FIG. 17, in step 1701, the electronic device collects an image and audio. For example, the electronic device can take an image, and store audio that is input during a time duration defined on a basis of a shutter input time point for the image-taking. Alternately, the electronic device can collect the image and the audio using a video taking function. In this case, the electronic device extracts at least one image from frames within a video track constructing a video, and collects audio from audio track. The electronic device can remove a bundle duration of a predetermined period or longer from the audio. Alternately, the electronic device can perform audio recording, and store an image captured at a specific time point within a duration of the audio recording.

The electronic device proceeds to step 1703 and analyzes the image. The electronic device extracts at least one image object from the image collected through the image analysis. The electronic device extracts and separates image objects such as a character, a thing, a face, and a background from the collected image, and identifies one or more main attributes of each image object. For example, the main attribute includes a location of an object within an image, a relative location or phase between a thing/area, a shape, a color, speaker related information, or metadata. To effectively extract the image object, the electronic device can further perform various image processing, such as identify a character through face recognition, and identify a speaker shown in the image on the basis of preset characteristic information of the speaker. The electronic device can estimate gender of the speaker and ages thereof. The electronic device can obtain supplementary data for the following corresponding relationship determination through a sensor device.

The electronic device proceeds to step 1705 and analyzes the audio. The electronic device extracts at least one audio object from the audio collected through the audio analysis. For this, the electronic device extracts a voice signal from an audio signal, and analyzes a characteristic such as a frequency band of the voice signal, a sound wave, a pattern of a frequency. To effectively perform the audio object extraction, the electronic device can perform processing such as noise removal, shutter sound removal, and background sound removal. The electronic device can obtain supplementary data for the following corresponding relationship determination from metadata of an audio file. When being able to determine the directivity of a sound source using a microphone, the electronic device can determine the directivity of the audio object, or amplify or separate a specific audio object. Alternately, the electronic device can bundle a plurality of features as an upper feature to define a plurality of audio objects as one group.

After analyzing the image and the audio, the electronic device proceeds to step 1707 and determines a corresponding relationship between the at least one image object and the at least one audio object. For example, the electronic device can determine the corresponding relationship on the basis of face recognition and waveform analysis. In an example, the electronic device maps an image object and an audio object whose characteristics correspond to each other. In another example, the electronic device can determine the corresponding relationship on the basis of a movement of a target. The electronic device recognizes the movement of the target within the image by using a preview screen of image-taking or a video track of a video, and maps an audio object generated when the movement exists to an image object corresponding to the target. The electronic device can also determine the corresponding relationship on the basis of the directivity of the audio. The electronic device maps an image object and an audio object whose directions are consistent with each other. The electronic device can determine the corresponding relationship according to user's designation. Alternately, the electronic device can set the corresponding relationship between an image object and an audio object generated at different time points, according to a correlation of the image object and the audio object.

The electronic device proceeds to step 1709 and encodes a combination data set, which includes image data, audio data, and mapping data. For example, the image data includes an image itself, image object designation information, a corrected image, and indirect information for accessing the image data, and the audio data includes the recorded entire audio, a processed audio, at least one audio object, audio characteristic information, and indirect information for accessing the audio data, and the mapping data includes object identification information and corresponding relationship information. The combination data set can be one of a first form in which image data is inserted into an audio file, a second form in which audio data is inserted into an image file, a 3rd form being a video file whose image data is constructed as a video track and audio data is constructed as an audio track, and a 4th form of adding separate mapping information data in which an image file, an audio file, and a mapping information database exist separately, respectively.

The method described above in relation with FIG. 17 under of the present invention may be provided as one or more instructions in one or more software modules, or computer programs stored in an electronic device including a portable terminal.

Figure 18:
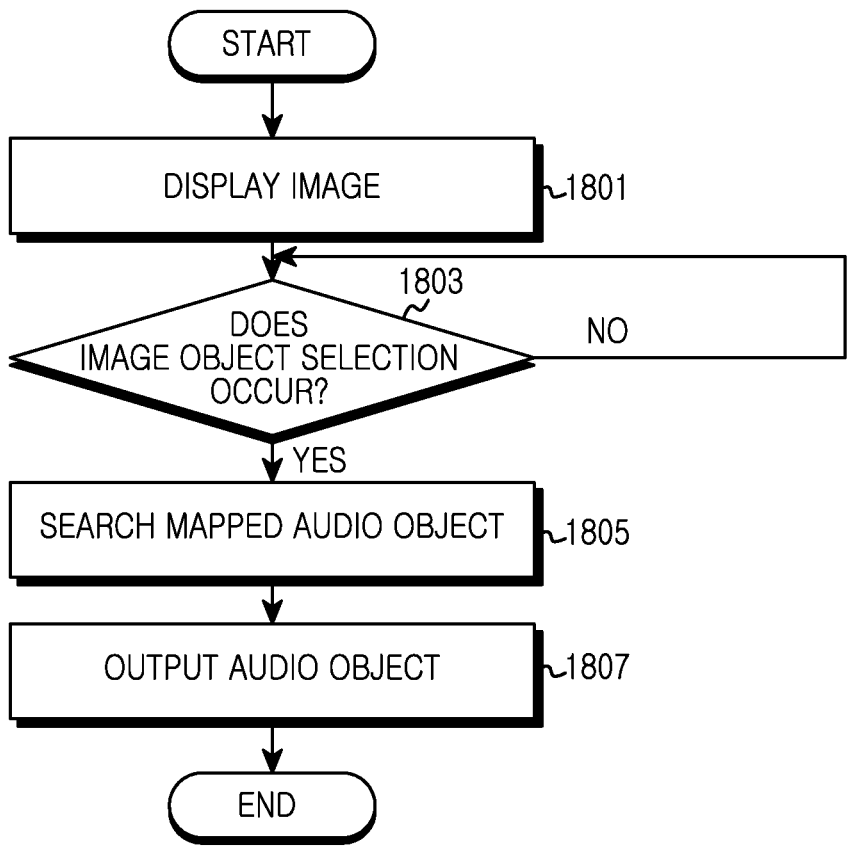
FIG. 18 illustrates an operation procedure of playing a combination data set of an image and audio in an electronic device according to an embodiment of the present invention.

FIG. 18 illustrates an operation procedure of playing a combination data set of an image and audio in an electronic device according to an embodiment of the present invention.

Referring to FIG. 18, in step 1801, the electronic device displays an image combined with audio. The electronic device can display a UI representing that it is the image combined to the audio. The electronic device can distinguish and display at least one image object mapped with audio object within the image. Alternately, the electronic device can further display the audio object output button mapped to the at least one image object.

In the image display state, the electronic device proceeds to step 1803 and determines whether at least one image object is selected. The selection can be defined as an event such as a touch, a click, or dragging. In another example, the selection can be defined as a voice input or character input for a name of a corresponding image object or an identifier thereof. Alternately, the selection of a plurality of image objects can be defined as multi touch or area selection.

If the at least one image object is selected, the electronic device proceeds to step 1805 and searches at least one audio object mapped to the selected at least one image object. In other words, the electronic device searches the at least one audio object on the basis of mapping data. For example, the electronic device can search a duration mapped to an image object among audio data of an audio file with reference to metadata of the audio file, subtitle information, and information stored in a separate field. The electronic device can search an audio object mapped to the image object among the audio data with reference to the metadata of the image file, the information stored in the separate field. The electronic device can verify records related to the image in a separate corresponding relationship database, and search an audio object mapped to an image object selected in the records. The electronic device can search a portion corresponding to an image object selected in an audio track of a video.

The electronic device proceeds to step 1807 and outputs the searched at least one audio object. If a plurality of image objects is selected, the electronic device can simultaneously or sequentially output a plurality of audio objects mapped with the plurality of image objects. At sequential output, the plurality of audio objects can be partially overlapped, and the output sequence of the plurality of audio objects can follow pre-designated order or generation order.

The method described above in relation with FIG. 18 under of the present invention may be provided as one or more instructions in one or more software modules, or computer programs stored in an electronic device including a portable terminal.

Figure 19:
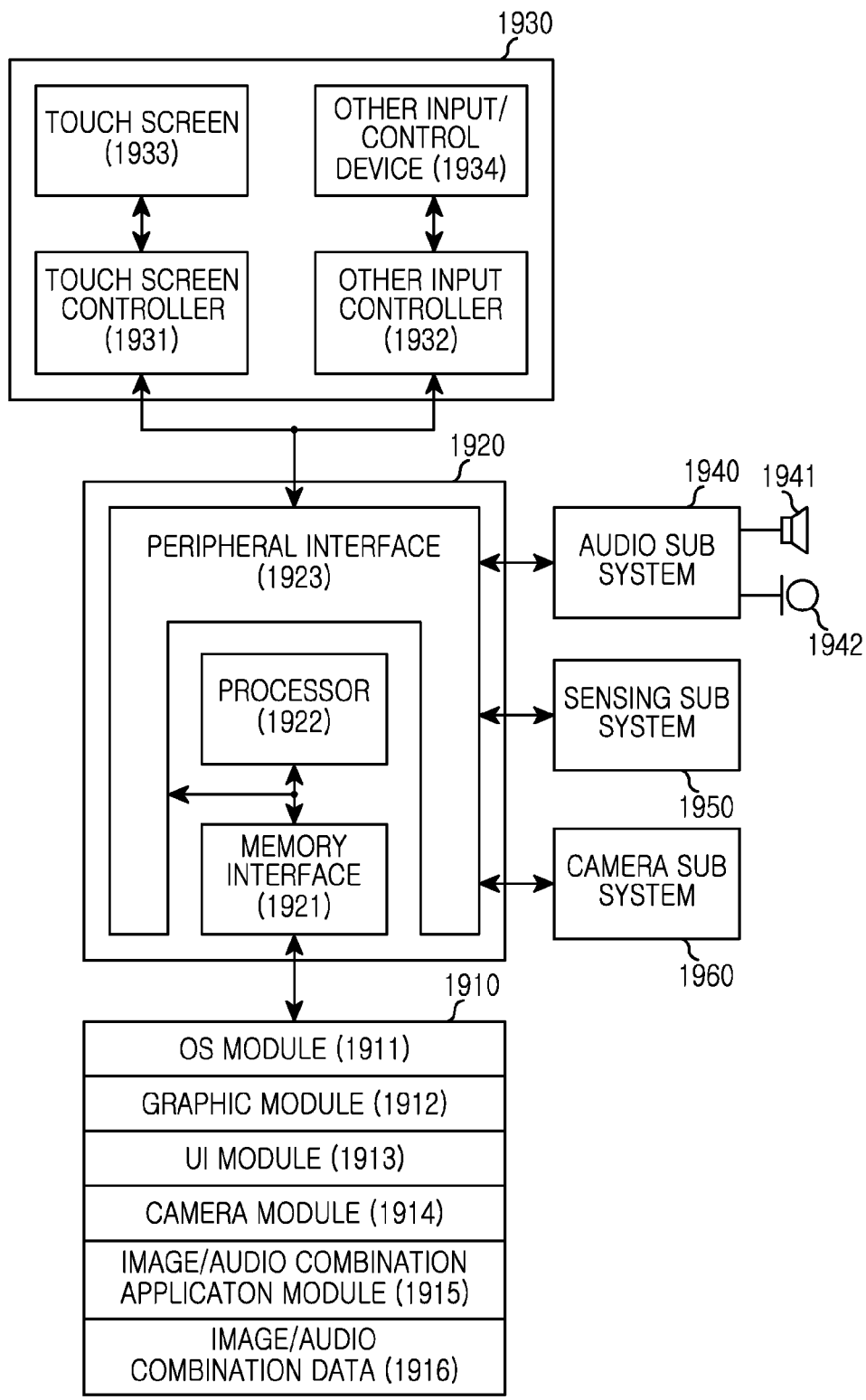
FIG. 19 illustrates a construction of an electronic device according to an embodiment of the present invention.

FIG. 19 illustrates a construction of an electronic device according to an embodiment of the present invention. The present invention may be implemented in the electronic device including a portable terminal such as, for example, a smart phone and a mobile telecommunication terminal. Hereunder, a portable terminal is used as an example for the electronic device.

The electronic device includes a memory 1910, a processor unit 1920, an input output system 1930, audio sub system 1940, a sensing sub system 1950, and a camera sub system 1960. The memory 1910 can be constructed in plural.

The memory 1910 stores at least one software, microcode, and setting information, for example. The memory 1910 includes at least one high-speed random access memory, a non-volatile memory, at least one optical storage device, or a flash memory (e.g., a Not AND (NAND) memory, a Not OR (NOR) memory). A software constituent element stored in the memory 1910 includes an Operating System (OS) module 1911, a graphic module 1912, a UI module 1913, a camera module 1914, an image/audio combination application module 1915, and image/audio combination data 1916. Since a module or a software constituent element can be exhibited as a set of instructions, the module is also referred to as an 'instruction set' or a 'program'. At least one module including instructions performing a method according to an embodiment of the present invention can be stored in the memory 1910.

The OS module 1911 includes at least one software constituent element controlling general system operation. For example, the OS module 1911 can be an embedded operating system such as WINDOWS, LINUX, Darwin, RTXC, UNIX, OS X, VxWorks, Android, and iOS. For example, the OS module 1911 controls general system operation control such as memory management and control, storage hardware control and management, and power control and management. The OS module 1911 controls to simplify communication between at least hardware elements and software constituent elements. The graphic module 1912 includes at least one software constituent element for providing and displaying a graphic on a touch screen 1933. The touch screen 1933 may be used as a display unit. The graphic includes a text, a web page, an icon, a digital image, a video, an animation. The UI module 1913 includes at least one software constituent element for providing a UI. For example, the UI module 1913 controls the manner in which a UI state is changed, in which conditions the change of the UI state is performed. The camera module 1914 includes at least one software constituent element for performing camera-related processes and functions.

The image/audio combination application module 1915 includes at least one software constituent element for combining an image and audio according to an embodiment of the present invention. In other words, the image/audio combination application module 1915 includes a software constituent element for generating a combination data set as in FIG. 17 and a software constituent element for playing the combination data set as in FIG. 18. The image/audio combination application module 1915 includes at least one software constituent element configured the electronic device to operate as described with reference to FIG. 1 to FIG. 16. The image/audio combination data 1916 includes a combination data set generated according to an embodiment of the present invention. For example, the image/audio combination data 1916 includes data of FIG. 2. The image/audio combination data 1916 can be constructed as in FIG. 6.

The memory 1910 includes an additional module besides the aforementioned modules 1911 to 1916. Alternately, a part of the aforementioned modules 1911 to 1916 can be excluded.

The processor unit 1920 includes a memory interface 1921, a processor 1922, and a peripheral interface 1923. The processor unit 1920 is referred to as a 'processor'. The memory interface 1921, the processor 1922, and the peripheral interface 1923 each can be a separate constituent element or be included in at least one integrated circuit.

The processor 1922 includes at least one hardware chip. By executing a software module, the processor 1922 performs a function of realizing the electronic device by the software module. Particularly, the processor 1922 interworks with software modules stored in the memory 1910 to implement an embodiment of the present invention. The processor 1922 includes at least one data processor and image processor. The data processor and the image processor can be constructed as a separate hardware. The processor 1922 can be composed of a plurality of processors performing different functions.

The memory interface 1921 provides a movement path of data and a control signal between the memory 1910 and the processor 1922. For example, the memory interface 1921 provides an interface for accessing the memory 1910. The peripheral interface 1923 connects the input output sub system 1930 of the electronic device and at least one peripheral device to the processor 1921 and the memory 1910.

The input output sub system 1930 includes a touch screen controller 1931, other input controller 1932, the touch screen 1933, and other input/control device 1934.

The touch screen controller 1931 can be combined to the touch screen 1933. The touch screen controller 1931 and the touch screen 1933 can detect a contact and a motion or an interruption thereof, by using not only capacitive, resistive, infrared and surface acoustic wave technologies for determining one or more contact points on the touch screen 1933, but also any multi-touch sensing technology including other proximity sensor arrays or other elements, for example.

The other input controller 1932 can be combined to the other input/control device 1934. The other input/control device 1934 includes at least one up/down button for volume control. The up/down button can have a form of a push button or locker button, a rocker switch, a thumb-wheel, a dial, a stick, and a pointer device such as a stylus, for example.

The touch screen 1933 provides an input/output interface between the electronic device and a user. For instance, the touch screen 1933 forwards a user's touch input to the electronic device. The touch screen 1933 is a medium for displaying an output of the electronic device to the user. That is, the touch screen 1933 displays a visual output to the user in the form of a text, a graphic, a video, and a combination thereof.

The touch screen 1933 can use various display means. For example, the touch screen 1933 includes, although not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The audio sub system 1940 can be combined to a speaker 1941 and a microphone 1942 to control input and output of an audio stream such as voice recognition, voice replication, digital recording, and phone function. That is, the audio sub system 1940 communicates with a user through the speaker 1941 and the microphone 1942. The audio sub system 1940 receives a data stream through the peripheral interface 1923 of the processor unit 1920, converts the received data stream into an electric signal, and forwards the converted electric signal to the speaker 1941. The speaker 1941 converts the electric signal into human-audible sound waves and outputs the converted sound waves.

The microphone 1942 converts a sound wave forwarded from a human or other sound sources into an electric signal. The audio sub system 1940 receives the converted electric signal from the microphone 1942. The audio sub system 1940 converts the received electric signal into audio data stream, and transmits the converted audio data stream to the peripheral interface 1923. The audio sub system 1940 includes a detachable earphone, headphone or headset, or includes a terminal for connecting the earphone, the headphone, and the headset. The microphone 1942 can be plural, and can be disposed on a front and a rear of the electronic device, respectively.

The sensing sub system 1950 detects an external stimulus. The sensing sub system 1950 includes an acceleration sensor, a gyro sensor, an optical sensor, a geomagnetic sensor, a gravity sensor, a temperature sensor, a biometric sensor, or a position sensor. A GPS module can be used as the position sensor. The sensing sub system 1950 senses movement, light, slope, and direction, for example, and provides an electrical signal indicating the sensing result. The sensing sub system 1950 can further include a block for interpreting an electrical signal indicating movement.

The camera sub system 1960 can perform a function of picture shooting and video recording. The camera sub system 1960 includes an image sensor (not shown) and a lens (not shown). The image sensor can be a Charged Combined Device (CCD) or Complementary Metal-Oxide Semiconductor (CMOS). For example, the camera sub system 1960 recognizes light input through the lens by the image sensor, and converts an image recognized in the image sensor into digital data.

Various functions of the electronic device according to the present invention can be executed by at least one stream processing, hardware including Application Specific Integrated Circuits (ASICs), software, and a combination of them.

Figure 20:
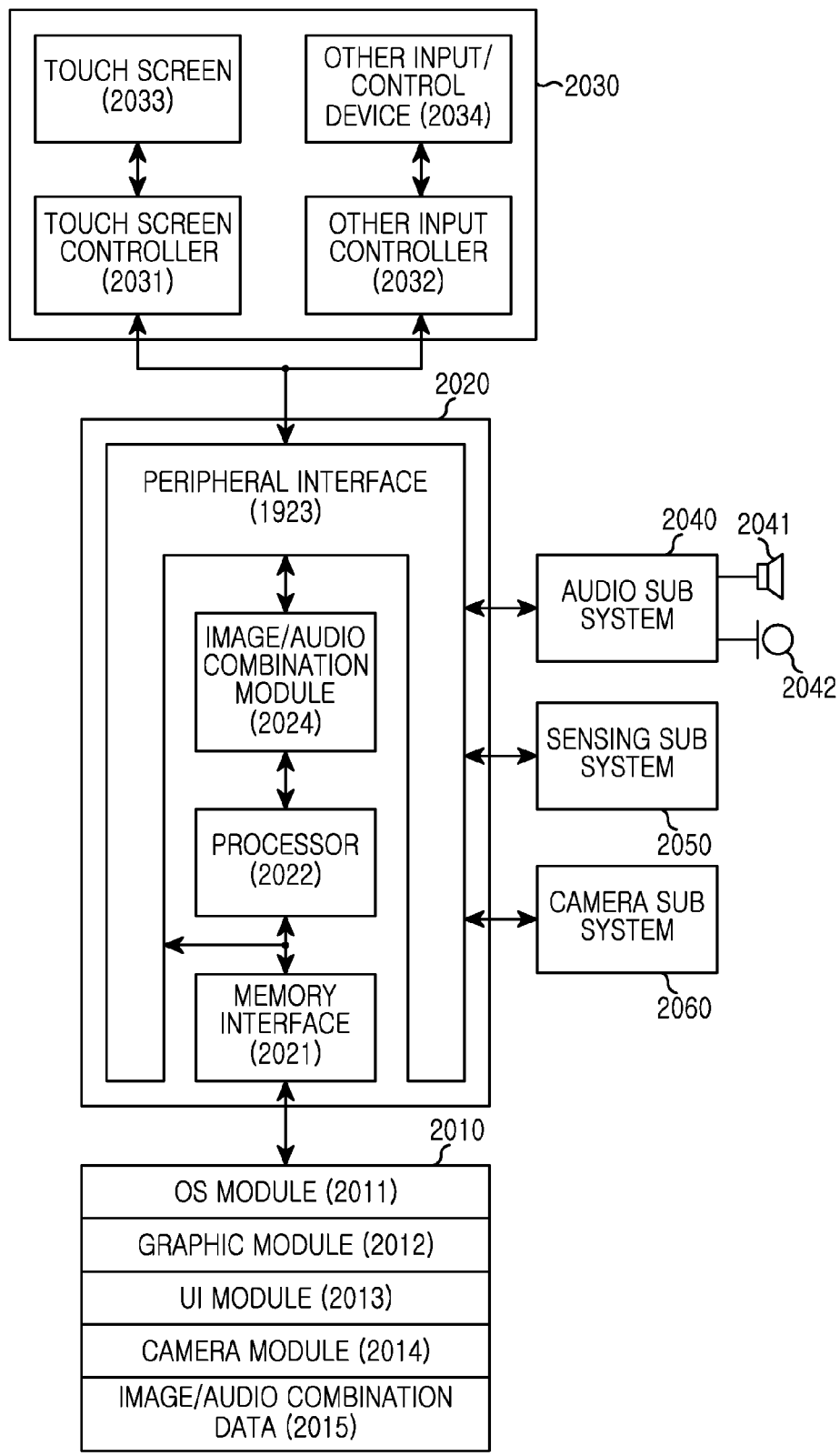
FIG. 20 illustrates a construction of an electronic device according to another embodiment of the present invention.

FIG. 20 illustrates a construction of an electronic device according to an embodiment of the present invention. Compared to FIG. 19, the construction of the electronic device of FIG. 20 represents an embodiment in which an image and audio combination and play function realized by software is realized by a hardware module. The present invention may be implemented in an electronic device including a portable terminal such as, for example, a smart phone and a mobile telecommunication terminal. Hereunder, a portable terminal is used as an example for the electronic device.

Referring to FIG. 20, the electronic device includes a memory 2010, a processor unit 2020, an input output system 2030, an audio sub system 2040, a sensing sub system 2050, and a camera sub system 2060. The memory 2010 can be constructed in plural.

The memory 2010 stores at least one software, microcode, setting information. The memory 2010 includes at least one high-speed random access memory, a non-volatile memory, at least one optical storage device, or a flash memory (e.g., a NAND memory, a NOR memory). A software constituent element stored in the memory 2010 includes an OS module 2011, a graphic module 2012, a UI module 2013, a camera module 2014, image/audio combination data 2015. Since a module or a software constituent element, can be exhibited as a set of instructions, the module is also referred to as an 'instruction set' or a 'program'. At least one module including instructions performing a method according to an embodiment of the present invention can be stored in the memory 2010.

The OS module 2011 includes at least one software constituent element controlling general system operation. For example, the OS module 2011 can be an embedded operating system such as WINDOWS, LINUX, Darwin, RTXC, UNIX, OS X, VxWorks, Android, and iOS. For example, the OS module 2011 controls general system operation control such as memory management and control, storage hardware control and management, and power control and management. The OS module 2011 controls to simplify communication between at least hardware element and at least software constituent element. The graphic module 2012 includes at least one software constituent element for providing and displaying a graphic on a touch screen 2033. The graphic includes a text, a web page, an icon, a digital image, a video, and an animation, for example. The UI module 2013 includes at least one software constituent element for providing a UI. For example, the UI module 2013 controls the manner in which a UI state is changed, and in which conditions the change of the UI state is performed. The camera module 2014 includes at least one software constituent element for performing camera-related processes and functions. The image/audio combination data 2015 includes a combination data set generated according to an embodiment of the present invention. For example, the image/audio combination data 2015 includes data of FIG. 2. The image/audio combination data 2015 can be constructed as in FIG. 6.

The memory 2010 includes an additional module besides the aforementioned modules 2011 to 2016. Alternately, a part of the aforementioned modules 2011 to 2016 can be excluded.

The processor unit 2020 includes a memory interface 2021, a processor 2022, a peripheral interface 2023, and an image/audio combination module 2024. The processor unit 2020 is referred to as a 'processor'. The memory interface 2021, the processor 2022, and the peripheral interface 2023 each can be a separate constituent element or be included in at least one integrated circuit.

The processor 2022 includes at least one hardware chip. By executing a software module, the processor 2022 performs a function of realizing the electronic device by the software module. Particularly, the processor 2022 interworks with software modules stored in the memory 2010 to implement an embodiment of the present invention. The processor 2022 includes at least one data processor and image processor. The data processor and the image processor can be constructed as a separate hardware. The processor 2022 can be composed of a plurality of processors performing different functions.

The image/audio combination module 2024 includes at least one function for combining an image and audio according to an embodiment of the present invention. In other words, the image/audio combination module 2024 performs functions for generating a combination data set as in FIG. 17 and functions for playing the combination data set as in FIG. 18. The image/audio combination module 2024 controls the electronic device to operate as described with reference to FIG. 1 to FIG. 16.

The memory interface 2021 provides a movement path of data and a control signal between the memory 2010 and the processor 2022. For example, the memory interface 2021 provides an interface for accessing the memory 2010. The peripheral interface 2023 connects the input output sub system 2030 of the electronic device and at least one peripheral device to the processor 2021 and the memory 2010.

The input output sub system 2030 includes a touch screen controller 2031, other input controller 2032, the touch screen 2033, and other input/control device 2034.

The touch screen controller 2031 can be combined to the touch screen 2033. The touch screen controller 2031 and the touch screen 2033 can detect a contact and a motion or an interruption thereof, by using not only capacitive, resistive, infrared and surface acoustic wave technologies for determining one or more contact points on the touch screen 2033, but also any multi-touch sensing technology including other proximity sensor arrays or other elements, for example.

The other input controller 2032 can be combined to the other input/control device 2034, which includes at least one up/down button for volume control. The up/down button can have a form of a push button or locker button, a rocker switch, a thumb-wheel, a dial, a stick, or a pointer device such as a stylus.

The touch screen 2033 provides an input/output interface between the electronic device and a user. For instance, the touch screen 2033 forwards a user's touch input to the electronic device. The touch screen 2033 is a medium for displaying an output of the electronic device to the user. For example, the touch screen 2033 displays a visual output to the user. The visual output can be presented in form of a text, a graphic, a video, and a combination thereof.

The touch screen 2033 can use various display means. For example, the touch screen 2033 includes, although not limited to, a Liquid Crystal Display (LCD), a Light-Emitting Device (LED), a Lighting Power Density (LPD), an Organic LED (OLED), an Active-Matrix OLED (AMOLED), or a FLED.

The audio sub system 2040 can be combined to a speaker 2041 and a microphone 2042 to control input and output of an audio stream such as voice recognition, voice replication, digital recording, and phone function. For example, the audio sub system 2040 communicates with a user through the speaker 2041 and the microphone 2042. The audio sub system 2040 receives a data stream through the peripheral interface 2023 of the processor unit 2020, converts the received data stream into an electric signal, and forwards the converted electric signal to the speaker 2041. The speaker 2041 converts the electric signal into human-audible sound waves and outputs the converted sound waves.

The microphone 2042 converts a sound wave forwarded from a human or other sound sources into an electric signal. The audio sub system 2040 receives the converted electric signal from the microphone 2042. The audio sub system 2040 converts the received electric signal into an audio data stream, and transmits the converted audio data stream to the peripheral interface 2023. The audio sub system 2040 includes a detachable earphone, headphone or headset, or includes a terminal for connecting the earphone, the headphone, and the headset. The microphone 2042 can be plural, and can be disposed on a front and a rear of the electronic device, respectively.

The sensing sub system 2050 detects an external stimulus. The sensing sub system 2050 includes an acceleration sensor, a gyro sensor, an optical sensor, a geomagnetic sensor, a gravity sensor, a temperature sensor, a biometric sensor, or a position sensor. A GPS module can be used as the position sensor. The sensing sub system 2050 senses movement, light, slope, and direction, and provides an electrical signal indicating the sensing result. The sensing sub system 2050 can further include a block for interpreting an electrical signal indicating movement.

The camera sub system 2060 can perform a function of picture shooting and video recording, for example. The camera sub system 2060 includes an image sensor (not shown) and a lens (not shown). The image sensor can be a Charged Combined Device (CCD) or Complementary Metal-Oxide Semiconductor (CMOS). For example, the camera sub system 2060 recognizes light input through the lens by the image sensor, and converts an image recognized in the image sensor into digital data.

Various functions of the electronic device according to the present invention can be executed by at least one stream processing, hardware including Application Specific Integrated Circuits (ASICs), software, and a combination thereof.

In storing audio and an image together, a user edits or stores the image and the audio in a form of a video file format using a separate authoring tool, or stores the image and the audio in a video format using a computing device into which a camera and a microphone are embedded. In storing in a video file, video file play, and search are merely supported, user input to the image is performed, and interaction such as specific video output according to this cannot be exhibited.

By analyzing and associating an image and audio with each other, an electronic device can selectively play the audio related to an image object within the image. For example, the electronic device can play audio related to an image capture situation and, by generating a media capable of interacting with the user, apply the media to an electronic album or a slide show. The electronic device can jointly provide image and audio data related to various situations.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

In the aforementioned embodiments of the present invention, constituent elements are exhibited in a single or plural form according to an embodiment. However, the present invention is not limited to the single or plural constituent elements. Although the constituent element is exhibited in the plural form, it can be constructed in the single form or, although the constituent element is exhibited in the single form, it can be constructed in the plural form.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of an electronic device, the method comprising:
   acquiring an image via at least one camera in the electronic device;
   acquiring audio for the image via at least one microphone in the electronic device;
   identifying at least one image object included in the acquired image
   identifying at least one audio object included in the acquired audio;
   generating mapping data including information for indicating a relationship between the identified at least one image object and the identified at least one audio object; and
   generating integrated data based on image data for the acquired image, audio data for the acquired audio, and the generated mapping data, wherein the audio data comprises information regarding a processed audio, and wherein the processed audio is generated by removing at least one of a mute duration, a noise, or a background shutter sound caused by the acquiring the image from the acquired audio.

2. The method of claim 1, wherein the audio is acquired during a duration determined based on a timing initializing to acquire the image.

3. The method of claim 1, wherein,
if the image is a still image, the image is acquired at a timing within a duration acquiring the audio, and
if the image is a moving image, the image is acquired within the duration acquiring the audio.

4. The method of claim 1, wherein identifying the at least one image object comprises identifying a closed area on the acquired image indicating a specific subject or a specific movement as the at least one image object.

5. The method of claim 1, further comprising:
identifying a face of a character in the image; and
determining a characteristic of the character by comparing the identified face of the character with reference face images of characters,
generating the image data comprising information for the characteristic,
wherein the characteristic comprises gender or ages.

6. The method of claim 1, further comprising separating a voice signal, by speaker, from the acquired audio.

7. The method of claim 6, wherein separating the voice signal by speaker comprises:
identifying a voice signal included in the audio; and
identifying a voice signal of each speaker by comparing a speaker-related feature with a characteristic of the identified voice signal.

8. The method of claim 7, wherein the speaker-related feature is determined through analysis of an image, analysis of an audio signal collected at a phone call, interpretation of a literal meaning through voice recognition, or direction determination.

9. The method of claim 6, wherein separating the voice signal by speaker comprises:
identifying a plurality of voice signals from the audio; and
separating the plurality of voice signals according to a direction in which the identified plurality of voice signals are received.

10. The method of claim 1, wherein generating the mapping data comprises:
generating the information for indicating the relationship between the identified at least one object and the identified at least one audio object, by respectively mapping, to the at least one object, the at least one audio object having a characteristic corresponding to a characteristic of the at least one object; and
generating the mapping data including the generated information for indicating the relationship.

11. The method of claim 1, wherein generating the mapping data comprises:
generating the information for indicating the relationship between the identified at least one object and the identified at least one audio object by respectively mapping, to the at least one image object, the at least one audio object that is received while the at least one image object is moving; and
generating the mapping data including the generated information for indicating the relationship.

12. The method of claim 1, wherein generating the mapping data comprises:

generating the information for indicating the relationship between the identified at least one object and the identified at least one audio object by respectively mapping, to the at least one image object, the at least one audio object having a reception direction corresponding to a direction of the at least one image object; and
generating the mapping data including the generated information for indicating the relationship.

13. The method of claim 1, wherein generating the mapping data comprises:
displaying a UI for setting the relationship between the identified at least one image object and the identified at least one audio object;
generating the information for indicating the relationship based on an input of a user's instruction on the displayed UI; and
generating the mapping data including the generated information for indicating the relationship.

14. The method of claim 1, wherein generating the mapping data comprises:
determining a combination relationship between the at least one image object and the at least one audio object that are identified from the image and the audio acquired at different time points, as the relationship; and
generating the mapping data including the information for indicating the combination relationship.

15. The method of claim 1, wherein a form of the integrated data is one of a first form in which the image data is inserted into the audio data, a second form in which the audio data is inserted into the image data, a third form in which the image data is constructed as a video track and the audio data is constructed as an audio track, and a fourth form in which the image data, the audio data, and the mapping data separately exist.

16. An electronic device, comprising:
at least one processor;
at least one camera operatively coupled to the at least one processor; and
at least one microphone operatively coupled to the at least one processor,
wherein the at least one processor is configured to:
acquire an image via at least one camera in the electronic device and acquire audio for the image via at least one microphone in the electronic device;
identify at least one image object included in the acquired image and identify at least one audio object included in the acquired audio;
generate mapping data including information for indicating a relationship between the identified at least one image object and the identified at least one audio object; and
generate integrated data based on image data for the acquired image, audio data for the acquired audio, and the generated mapping data,
wherein the audio data comprises information regarding a processed audio, and
wherein the processed audio is generated by removing at least one of a mute duration, a noise, or a background shutter sound caused by the acquiring the image from the acquired audio.

17. The device of claim 16, wherein the audio is acquired during a duration determined based on a timing initializing to acquire the image.

18. The device of claim 16, wherein,
if the image is a still image, the image is acquired at a timing within a duration acquiring the audio, and
if the image is a moving image, the image is acquired within the duration acquiring the audio.

19. The device of claim 16, wherein the at least one processor is configured to:
identify a closed area on the acquired image indicating a specific subject or a specific movement as the at least one image object.

20. The device of claim 16, wherein the at least one processor is further configured to:
identify a face of a character in the image;
determine a characteristic of the character by comparing the identified face of the character with reference face images of characters; and
generate the image data comprising information for the characteristic, and
wherein the characteristic comprises gender or ages.

21. The device of claim 16, wherein the processor separates a voice signal by a speaker from the acquired audio.

22. The device of claim 21, wherein the at least one processor is configured to:
identify a voice signal included in the audio; and
identify a voice signal of each speaker by comparing a speaker-related feature with a characteristic of the identified voice signal.

23. The device of claim 22, wherein the speaker-related feature is determined through analysis of an image, analysis of an audio signal collected at phone call, interpretation of literal meaning through voice recognition, or direction determination.

24. The device of claim 21, wherein the at least one processor is configured to:
identify a plurality of voice signals from the audio; and
separate the plurality of voice signals according to a direction in which the identified plurality of voice signals are received.

25. The device of claim 16, wherein the at least one processor is configured to:
generate the information for indicating the relationship between the identified at least one object and the identified at least one audio object, by respectively mapping, to the at least one object, the at least one audio object having a characteristic corresponding to a characteristic of the at least one object; and
generate the mapping data including the generated information for indicating the relationship.

26. The device of claim 16, wherein the at least one processor is configured to:
generate the information for indicating the relationship between the identified at least one object and the identified at least one audio object by respectively mapping, to the at least one image object, the at least one audio object that is received while the at least one image object is moving; and
generate the mapping data including the generated information for indicating the relationship.

27. The device of claim 16, wherein the at least one processor is configured to:
generate the information for indicating the relationship between the identified at least one object and the identified at least one audio object by respectively mapping, to the at least one image object, the at least one audio object having a reception direction corresponding to a direction of the at least one image object; and
generate the mapping data including the generated information for indicating the relationship.

28. The device of claim 16, wherein the at least one processor is configured to:
display a UI for setting the relationship between the identified at least one image object and the identified at least one audio object;
generate the information for indicating the relationship based on an input of a user's instruction on the displayed UI; and
generate the mapping data including the generated information for indicating the relationship.

29. The device of claim 16, wherein the at least one processor is configured to:
determine a combination relationship between the at least one image object and the at least one audio object that are identified from the image and the audio acquired at different time points, as the relationship;
generate the mapping data including the information for indicating the combination relationship.

30. The device of claim 16, wherein a form of the integrated data is of one of a first form in which the image data is inserted into the audio data, a second form in which the audio data is inserted into the image data, a third form in which the image data is constructed as a video track and the audio data is constructed as an audio track, and a fourth form in which the image data, the audio data, and the mapping data separately exist.

31. An electronic device, comprising:
a memory configured to store at least one software module; and
a processor configured to execute the at least one software module stored in the memory,
wherein the at least one software module comprises at least one instruction set of controlling to:
acquire an image via at least one camera in the electronic device and acquire audio for the image via at least one microphone in the electronic device;
identify at least one image object included in the acquired image and identify at least one audio object included in the acquired audio;
generate mapping data including information for indicating a relationship between the identified at least one image object and the identified at least one audio object; and
generate integrated data based on image data for the acquired image, audio data for the acquired audio, and the generated mapping data,
wherein the audio data comprises information regarding a processed audio, and
wherein the processed audio is generated by removing at least one of a mute duration, a noise, or a background shutter sound caused by the acquiring the image from the acquired audio.

32. A method of an electronic device, the method comprising:
displaying a first image input through a first camera and a second image input through a second camera;
if a direction in which audio is received corresponds to a direction of the first camera, generating first data by mapping the first image input through the first camera to the audio; and
if the direction in which the audio is received corresponds to a direction of the second camera, generating second data by mapping the second image input through the second camera to the audio, wherein the second image is displayed to occupy a portion of an area within the first image, and wherein, if the direction in which the audio is received corresponds to the direction of the second camera, a display size of the second image is extended.

* * * * *